US012591341B2

(12) United States Patent
Seol et al.

(10) Patent No.: US 12,591,341 B2
(45) Date of Patent: Mar. 31, 2026

(54) DISPLAY DEVICE INCLUDING POSITION INPUT SYSTEM WITH PATTERN PROTECTION LAYER

(71) Applicant: SAMSUNG DISPLAY CO., LTD., Yongin-si (KR)

(72) Inventors: Jun Yeong Seol, Yongin-si (KR); Sung Guk An, Yongin-si (KR); Da Som Gu, Yongin-si (KR); Ki Jun Roh, Yongin-si (KR); Hee Young Lee, Yongin-si (KR); So Yeon Han, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/465,713

(22) Filed: Sep. 12, 2023

(65) Prior Publication Data

US 2024/0256090 A1 Aug. 1, 2024

(30) Foreign Application Priority Data

Jan. 31, 2023 (KR) ........................ 10-2023-0013119

(51) Int. Cl.
*G06F 3/044* (2006.01)
*G06F 3/041* (2006.01)

(52) U.S. Cl.
CPC .......... *G06F 3/0442* (2019.05); *G06F 3/0412* (2013.01); *G06F 3/0441* (2019.05); *G06F 3/0446* (2019.05); *G06F 2203/04107* (2013.01)

(58) Field of Classification Search
CPC ....... G06F 3/0317–0321; G06F 3/0354; G06F 3/03542; G06F 3/03545; G06F 3/0412; G06F 3/04164; G06F 3/0441–0446; G06F 3/0448; G06F 2203/0381; G06F 2203/04103; G06F 2203/04106; G06F 2203/04107; G06F 2203/04114; H10K 59/40; H10K 59/95
See application file for complete search history.

(56) References Cited

U.S. PATENT DOCUMENTS

| | | | | |
|---|---|---|---|---|
| 2008/0019616 A1* | 1/2008 | Hotta | .................... | G06F 3/0421 |
| | | | | 382/187 |
| 2011/0109641 A1* | 5/2011 | Yoshida | .............. | G06F 3/03545 |
| | | | | 345/589 |
| 2014/0093708 A1* | 4/2014 | Yamada | .................. | G06F 3/041 |
| | | | | 428/203 |

(Continued)

FOREIGN PATENT DOCUMENTS

| | | |
|---|---|---|
| CN | 107688402 | 2/2018 |
| KR | 10-1766447 | 8/2017 |

(Continued)

*Primary Examiner* — Keith L Crawley
(74) *Attorney, Agent, or Firm* — F. CHAU & ASSOCIATES, LLC

(57) ABSTRACT

A display device includes a display unit, a touch sensing unit disposed on a front surface of the display unit, a code placement unit including a plurality of code patterns and a pattern protection layer, and disposed on the touch sensing unit, and an adhesive material disposed on the code placement unit, wherein the pattern protection layer covers the plurality of code patterns and separates the plurality of code patterns from the adhesive material.

19 Claims, 13 Drawing Sheets

(56) References Cited

U.S. PATENT DOCUMENTS

| | | | | |
|---|---|---|---|---|
| 2014/0145066 | A1* | 5/2014 | Geaghan | G06F 3/0321 |
| | | | | 250/206.1 |
| 2014/0295151 | A1* | 10/2014 | Gotou | G03B 21/60 |
| | | | | 428/201 |
| 2016/0320875 | A1* | 11/2016 | Yoshida | G06F 3/042 |
| 2017/0098146 | A1* | 4/2017 | Sjögren | G06F 3/0321 |
| 2018/0251647 | A1* | 9/2018 | Sharma | H05K 1/0274 |
| 2019/0138115 | A1* | 5/2019 | Thomas, III | G06F 3/0317 |
| 2019/0305072 | A1* | 10/2019 | Park | H10K 50/82 |
| 2022/0229514 | A1* | 7/2022 | Park | H10K 59/40 |
| 2022/0392962 | A1* | 12/2022 | Park | G06F 3/04164 |
| 2023/0023671 | A1* | 1/2023 | Shim | G06F 3/0412 |

FOREIGN PATENT DOCUMENTS

| | | |
|---|---|---|
| KR | 10-2177081 | 11/2020 |
| KR | 10-2212049 | 2/2021 |
| KR | 10-2277769 | 7/2021 |
| KR | 10-2021-0153019 | 12/2021 |

* cited by examiner

DISPLAY DEVICE INCLUDING POSITION INPUT SYSTEM WITH PATTERN PROTECTION LAYER

CROSS-REFERENCE TO RELATED APPLICATION

This application claims priority under 35 U.S.C. § 119 to Korean Patent Application No. 10-2023-0013119, filed on Jan. 31, 2023 in the Korean Intellectual Property Office, the disclosure of which is herein incorporated by reference in its entirety.

BACKGROUND

1. Technical Field

The present disclosure relates to a display device and a position input system including the same.

2. Discussion of Related Art

With the advance of information-oriented technologies, increased demands are being placed on display devices for displaying images in various ways. For example, display devices are employed in various electronic devices such as smartphones, digital cameras, laptop computers, navigation devices, and smart televisions. A display device may be, for example, a flat panel display device such as a liquid crystal display device, a field emission display device or an organic light emitting display device. In the case of the organic light emitting display device, since each pixel of a display panel includes a light emitting element capable of emitting light by itself, an image can be displayed without a backlight unit providing light to the display panel.

Touch sensitive display devices are also being use in increasingly numerous and diverse applications. A touch sensitive display device may sense a touch input. The touch input may be achieved using a user's body part (e.g., a finger) or a touch input using an electronic pen. The electronic pen may have a fine point and may be a more accurate means of touch input than the touch input using a finger.

SUMMARY

Aspects of the present disclosure provide a display device capable of reducing or preventing chemical component change and long-term aging of code patterns formed in a code placement unit of a display panel and more accurately performing touch input of a position input device, and a position input system including the same.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an embodiment of the disclosure, a display device includes a display unit, a touch sensing unit disposed on a front surface of the display unit, a code placement unit including a plurality of code patterns and a pattern protection layer, and disposed on the touch sensing unit, and an adhesive material disposed on the code placement unit, wherein the pattern protection layer covers the plurality of code patterns and separates the plurality of code patterns from the adhesive material.

In an embodiment, the code placement unit may further include a transparent insulating layer forming a rear surface of the code placement unit facing the touch sensing unit, wherein the plurality of code patterns may have preset planar code shapes on a surface of the transparent insulating layer, and wherein the pattern protection layer may cover the plurality of code patterns and at least a portion of the surface of the transparent insulating layer.

In an embodiment, the plurality of code patterns may have planar code shapes on a transparent layer of the code placement unit, wherein the pattern protection layer may be formed to cover the plurality of code patterns and at least a portion of a surface of the transparent layer, and wherein the pattern protection layer of the code placement unit may be attached to face the touch sensing unit by a first adhesive layer.

In an embodiment, the plurality of code patterns may have planar code shapes on a transparent layer of the code placement unit, wherein the transparent layer may form a rear surface of the code placement unit facing the touch sensing unit, and wherein a second adhesive layer may be disposed on the transparent layer and attaches the code placement unit to the touch sensing unit.

According to an embodiment of the disclosure, a display device includes a display unit including a plurality of emission areas, a touch sensing unit disposed on a front surface of the display unit, a code placement unit including a plurality of code patterns and a pattern protection layer covering and shielding the plurality of code patterns, and disposed on the touch sensing unit, an adhesive material disposed on the code placement unit, and a front protective cover attached to the code placement unit by the adhesive material.

In an embodiment, the pattern protection layer may cover the plurality of code patterns and separate the plurality of code patterns from the adhesive material.

In an embodiment, the code placement unit may further include a transparent insulating layer forming a rear surface of the code placement unit facing the touch sensing unit, wherein the plurality of code patterns may have planar code shapes on a surface of the transparent insulating layer, and wherein the pattern protection layer may cover the plurality of code patterns and at least a portion of the surface of the transparent insulating layer.

In an embodiment, the pattern protection layer may include at least one inorganic layer including a silicon nitride layer, a silicon oxynitride layer, a silicon oxide layer, a titanium oxide layer, or an aluminum oxide layer.

In an embodiment, the pattern protection layer may include at least one organic layer including an acrylic resin, an epoxy resin, a phenolic resin, a polyamide resin, or a polyimide resin.

In an embodiment, the plurality of code patterns may have a width at least equal to widths of driving electrodes, sensing electrodes, and dummy electrodes formed in the touch sensing unit.

In an embodiment, a planar code shape of the plurality of code patterns has a pattern shape including at least one of a polygonal pattern shape, a polygonal closed loop pattern shape, a mesh pattern structure, or an open loop pattern shape.

In an embodiment, the code placement unit may include a transparent layer forming a rear surface of the code placement unit facing the touch sensing unit, and a reflection pattern layer including a plurality of reflective patterns formed below the plurality of code patterns corresponding to a code pattern formation region, and disposed between the code placement unit and the transparent layer.

In an embodiment, the plurality of code patterns may have planar code shapes disposed on a reflection pattern of the reflection pattern layer, wherein the pattern protection layer may cover the plurality of code patterns and the reflection pattern layer, and wherein the adhesive material is applied on to the pattern protection layer.

In an embodiment, the plurality of reflective patterns may be formed in a region in which touch electrodes and dummy electrodes of the touch sensing unit are disposed and in the code pattern formation region, and wherein a remaining region in which the plurality of reflective patterns are not formed may be formed of a silicon nitride layer, a silicon oxynitride layer, a silicon oxide layer, a titanium oxide layer, or an aluminum oxide layer.

In an embodiment, the plurality of code patterns may have planar code shapes on a transparent layer, wherein the pattern protection layer may be formed to cover the plurality of code patterns and at least a portion of a surface of the transparent layer.

In an embodiment, the plurality of code patterns may have planar code shapes on a transparent layer of the code placement unit, wherein the pattern protection layer may be formed to cover the plurality of code patterns and at least a portion of a surface of the transparent layer, and wherein the pattern protection layer of the code placement unit may be attached to face the touch sensing unit by a first adhesive layer.

In an embodiment, the plurality of code patterns may have planar code shapes on a transparent layer of the code placement unit, wherein the transparent layer may form a rear surface of the code placement unit facing the touch sensing unit, wherein a second adhesive layer may be disposed on the transparent layer and attaches the code placement unit to the touch sensing unit.

According to an embodiment of the disclosure, a position input system comprising a display device displaying an image, and a position input device in which coordinate data is input, wherein the display device comprises a display unit including a plurality of emission areas, a touch sensing unit disposed on a front surface of the display unit to sense touch coordinates, a code placement unit including a pattern protection layer covering and shielding a plurality of code patterns, and disposed on the touch sensing unit, an adhesive material disposed on the code placement unit, and a front protective cover attached on to the code placement unit by the adhesive material.

In an embodiment, the pattern protection layer may cover the plurality of code patterns and separates the plurality of code patterns from the adhesive material.

In an embodiment, the plurality of code patterns may have planar code shapes on a transparent layer of the code placement unit, wherein the pattern protection layer may be formed to cover the plurality of code patterns and at least a portion of a surface of the transparent layer, and wherein the pattern protection layer of the code placement unit may be attached to face the touch sensing unit by a first adhesive layer.

In accordance with the display device and the position input system including the same according to some embodiments, it is possible to form a pattern protection layer blocking code patterns of the code placement unit to prevent chemical component change and long-term aging of the code patterns. In particular, it may be possible to extend the lifespan of code patterns and more accurately perform touch input of a position input device.

Further, in accordance with the display device and the position input system including the same according to some embodiments, it is possible to generate the touch coordinate data of the position input device more quickly and accurately using the code patterns of the display panel without complicated calculation and correction, and also possible to input the touch input of the position input device.

However, the effects of the present disclosure are not limited to the aforementioned effects, and various other effects are included in the present disclosure.

BRIEF DESCRIPTION OF THE DRAWINGS

The above and other aspects and features of the present disclosure will become more apparent by describing in detail embodiments thereof with reference to the attached drawings, in which.

DETAILED DESCRIPTION

The present disclosure will now be described more fully hereinafter with reference to the accompanying drawings, in which preferred embodiments of the disclosure are shown. This disclosure may, however, be embodied in different forms and should not be construed as limited to embodiments set forth herein. Rather, embodiments are provided so that this disclosure will be thorough and complete, and will fully convey the scope of the disclosure to those skilled in the art.

It will also be understood that when a layer is referred to as being "on" another layer or substrate, it can be directly on the other layer or substrate, or intervening layers may also be present. The same reference numbers indicate the same components throughout the specification.

It will be understood that, although the terms "first," "second," etc. may be used herein to describe various elements, these elements should not be limited by these terms. These terms are only used to distinguish one element from another element. For instance, a first element could be termed a second element without departing from the teachings of the present disclosure. Similarly, the second element could also be termed the first element.

Features of the various embodiments of the present disclosure may be combined or combined with each other, in part or in whole. Various combinations of the features are possible. Different embodiments may be implemented independently of each other or may be implemented together in an association.

Hereinafter, illustrative embodiments will be described in detail with reference to the accompanying drawings.

Figure 1:
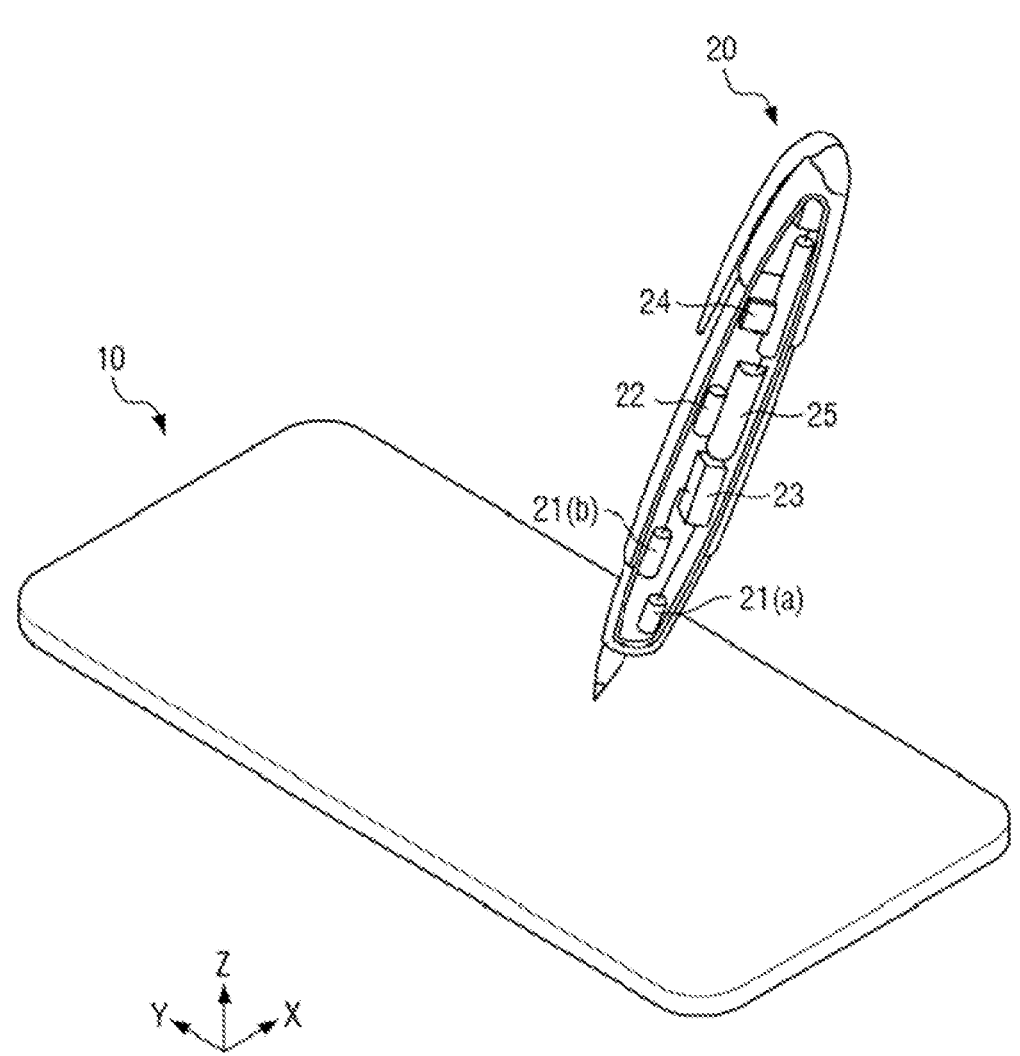
FIG. 1 is a block diagram showing a position input system according to an embodiment of the present disclosure.
Figure 2:
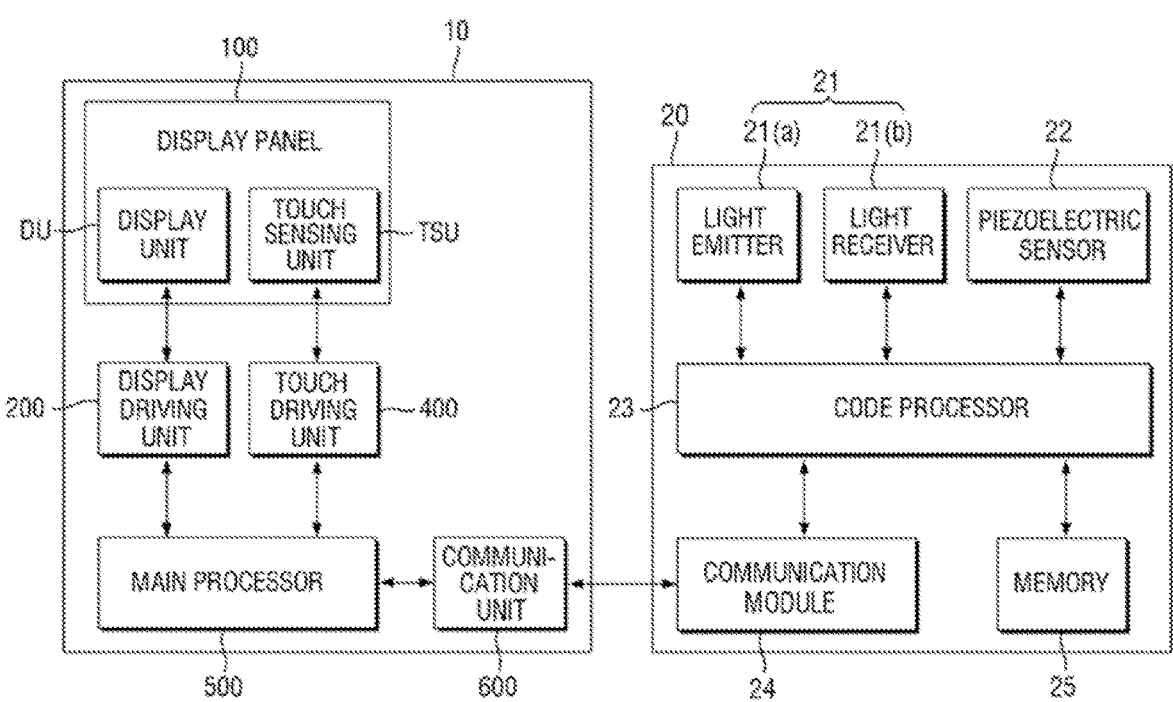
FIG. 2 is a block diagram specifically illustrating a position input device and a display device shown in FIG. 1.

FIG. 1 is a block diagram showing a position input system according to an embodiment of the present disclosure. FIG. 2 is a block diagram illustrating a position input device and a display device shown in FIG. 1.

Referring to FIG. 1 and FIG. 2, a display device 10 may be implemented in portable electronic devices such as a mobile phone, a smartphone, a tablet personal computer, a mobile communication terminal, an electronic organizer, an electronic book, a portable multimedia player (PMP), a navigation system, an ultra mobile PC (UMPC) or the like. For example, the display device 10 may be implemented as a display unit of a television, a laptop, a monitor, a billboard, or an Internet-of-Things (IoT) device. In another example, the display device 10 may be implemented in wearable devices such as a smart watch, a watch phone, a glasses type display, or a head mounted display (HMD). Applications of the display device 10 are not limited to examples described herein, and the display device 10 may be implemented in other applications.

The display device 10 may include a display panel 100, a display driving unit 200, a touch driving unit 400, a main processor 500, and a communication unit 600. In addition, a position input device 20 may include a code detector 21, a piezoelectric sensor 22, a code processor 23, a communication module 24, and a memory 25.

The display device 10 may be used in combination with the position input device 20 as a touch input device. The display panel 100 of the display device 10 may include a display unit DU and a touch sensing unit TSU. The display unit DU may be configured to display an image. The touch sensing unit TSO may be configured to sense a touch of a body part, such as a finger, or a position input device 20. Also, a code placement unit may be attached to or mounted on the touch sensing unit TSU. The code placement unit may include a plurality of code patterns. The code placement unit may be attached to or mounted on a front surface of the touch sensing unit TSU. Here, the code patterns of the code placement unit may be position code detection patterns that may be sensed by the position input device 20. The code patterns of the code placement unit may have placement structures and shapes that may correspond to coordinate data. In some embodiments, the touch sensing unit TSU and the code placement unit may be integrally formed by stacking the code placement unit on the touch sensing unit TSU, for example, where the code placement unit may be on the front surface of the touch sensing unit TSU.

The display unit DU of the display panel 100 may include a plurality of pixels. The display unit DU of the display panel 100 may display an image through the plurality of pixels.

The touch sensing unit TSU may be formed on a front surface of the display panel 100. The touch sensing unit TSU may include a plurality of touch electrodes. The touch sensing unit TSU may include a plurality of touch electrodes for sensing a touch in a capacitive manner. Examples of objects that may be sensed in a capacitive manner may include a finger, or a material that may conduct electricity such as copper or aluminum, which may be implemented in a capacitive pen, or a capacitive glove.

The code placement unit may be disposed on the front surface of the touch sensing unit TSU on which a plurality of touch electrodes are formed. The code placement unit may include the code patterns, and the code patterns may be formed at preset intervals. The code patterns may be formed on the front side of the touch electrodes. The code patterns may be formed on the front side of the touch electrodes in areas between pixels formed on the display unit DU. The code patterns may be directly formed on the front surfaces of the touch electrodes. Alternatively, the code patterns may be formed on an insulating layer or a transparent layer to cover the front surfaces of some touch electrodes with a predetermined area. In other words, the code patterns may not be directly formed on the front surface of the touch electrodes. The code patterns may be formed on a separate transparent layer and disposed on the front surface of the touch sensing unit TSU together with the transparent layer. In the case where the code patterns are formed on the separate transparent layer, the code patterns may be formed to correspond to the positions of the touch electrodes on the transparent layer. The formation structure of the code placement unit and the code patterns disposed on the top or front of the touch sensing unit TSU can be applied in various structures, and is not limited to any one embodiment. Hereinafter, an example in which code patterns are formed on a transparent layer or an insulating layer and disposed on the front surface of the touch sensing unit TSU together with the transparent layer or insulating layer will be described. A detailed formation structure of code patterns is described herein in detail with reference to the accompanying drawings.

The display driving unit 200 may output signals and voltages for driving the display unit DU. The display driving unit 200 may supply data voltages to data lines. The display driving unit 200 may supply a power voltage to a power line and may supply gate control signals to a gate driver.

The touch driving unit 400 may be connected to the touch sensing unit TSU. The touch driving unit 400 may supply a touch driving signal to a plurality of touch electrodes of the touch sensing unit TSU. The touch driving unit 400 may sense an amount of change in capacitance between the plurality of touch electrodes. The touch driving unit 400 may calculate whether a user's input is made and input touch coordinates based on an amount of change in capacitance between the plurality of touch electrodes.

The main processor 500 may control one or more functions of the display device 10. The main processor 500 may control all functions of the display device 10. For example, the main processor 500 may supply digital video data to the display driving unit 200, which may cause the display panel 100 to display an image. Further, the main processor 500 may receive touch data from the touch driving unit 400, using the touch data to determine touch coordinates selected by a user (e.g., a user's finger), and generate digital video data according to the touch coordinates, or execute an application associated with an icon displayed by the display panel 100 at the touch coordinates selected by the user's finger. In yet another example, the main processor 500 may receive coordinate data from the position input device 20, use the coordinate data to determine touch coordinates selected using the position input device 20, and generate digital video data according to the touch coordinates, or execute an application associated with an icon displayed by the display panel 100 at the touch coordinates selected using the position input device 20.

The communication unit 600 may communicate with an external device. The communication unit 600 may be configured for wired communication with the external device, for example, through a USB cable. The communication unit 600 may be configured for wireless communication with the external device, for example, through BLUETOOTH® wireless communications. For example, the communication unit 600 may transmit/receive a communication signal to/from a communication module 24 of the position input device 20. The communication unit 600 may receive coordinate data including data codes from the position input device 20, and may provide the coordinate data including the data codes to the main processor 500.

The position input device 20 may be used as a touch input device. The position input device 20 may be configured as an electronic pen, for example. The electronic pen may be a smart pen. The position input device 20 may be an electronic pen that detects display light of the display panel 100 or light reflected from the display panel 100 using an optical method. The position input device 20 may detect the code patterns included in the code placement unit of the display panel 100 based on the detected light. The position input device 20 may generate coordinate data using the detected code patterns. The position input device 20 may be an electronic pen such as a smart pen in the shape of a writing instrument, but is not limited to the shape or structure of a writing instrument. The position input device 20 may have various shapes and structures.

The code detector 21 of the position input device 20 may be disposed adjacent to a pen tip of the position input device 20. The code detector 21 may detect grid patterns and the code patterns included in the display panel 100. To this end, the code detector 21 may include at least one light emitting unit 21(*a*) for emitting infrared light using at least one infrared light source. The code detector 21 may further include at least one light receiving unit 21(*b*) for detecting infrared light reflected from the grid patterns and the code patterns using an infrared camera.

At least one infrared light source included in the light emitting unit 21(*a*) may be configured as an infrared Light Emitting Diode (LED) array having a matrix structure. In addition, the infrared camera of the light receiving unit 21(*b*) may include a filter that allows infrared light to pass while blocking wavelength bands other than the infrared light, a lens system for focusing the infrared light that has passed through the filter, and an optical image sensor that may convert an optical image formed by the lens system into an electrical image signal that may be output. The optical image sensor may include an array in a matrix structure. The matrix structure may be substantially similar to the infrared LED array. The optical image sensor may provide shape data of the code patterns to the code processor 23 according to the shape and amount of reflected light reflected from the touch electrodes, the pixels, and the code patterns. In this way, the code detector 21 of the position input device 20 may detect the code patterns according to the user's control and movement, and generate the shape data of the code patterns that may be provided to the code processor 23. The code detector 21 may continuously detect the code patterns and generate the shape data.

The code processor 23 may receive the shape data of the code patterns from the code detector 21. The code processor 23 may continuously or periodically receive the shape data from the code detector 21. The code processor 23, using the shape data, may identify shapes and placement structures of the code patterns. Using the identified shapes and placement structures of the code patterns, the code processor 23 may extract or generate coordinate data. For example, the identified shapes and placement structures may have unique characteristics that may be matched to known coordinate data. The touch coordinates may be extracted according to a match result of the identified shapes and placement structures to the known coordinate data. The code processor 23 may transmit coordinate data, including the touch coordinates, to the display device 10 through the communication module 24. In this way, the code processor 23 may use the known coordinate data of the placement structures and the shapes of the code patterns to generate the touch coordinates using a matching method. The matching method may be performed in real time without complex computation and correction.

The communication module 24 may communicate with an external device. The communication module 24 may be configured for wired communication with the external device, for example, through a USB cable. The communication unit 600 may be configured for wireless communication with the external device, for example, through BLUETOOTH® wireless communications. For example, the communication module 24 may transmit/receive a communication signal to/from the communication unit 600 of the display device 10. The communication module 24 may receive coordinate data including the touch coordinates from the code processor 23, and may provide the coordinate data including the touch coordinates to the communication unit 600.

The memory 25 may store data for driving the position input device 20. The memory 25 may store input touch coordinates and known coordinate data corresponding to positions of code patterns, shape images, and shape data. The memory 25 may share the input touch coordinates and the known coordinate data corresponding to positions of code patterns, shape images, or shape data with the code processor 23.

Figure 3:
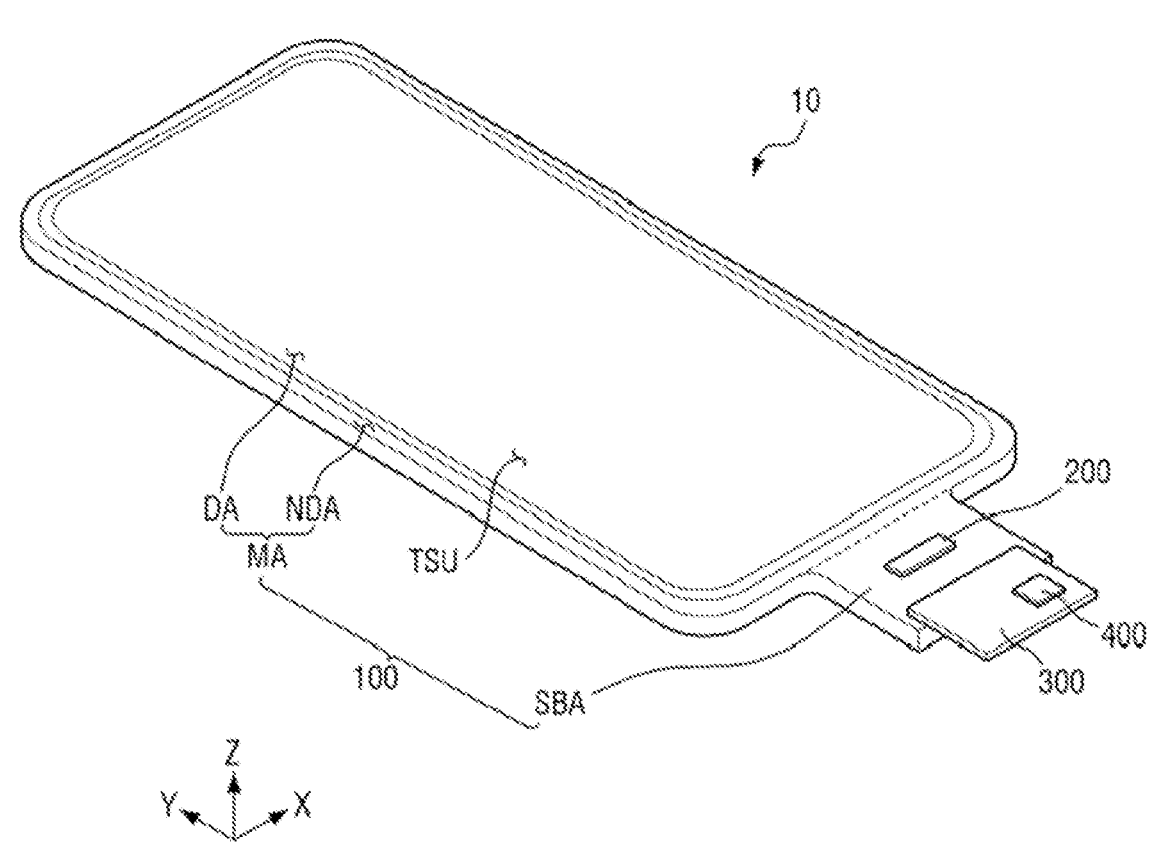
FIG. 3 is a perspective view specifically illustrating the configuration of the display device illustrated in FIG. 2.
Figure 4:
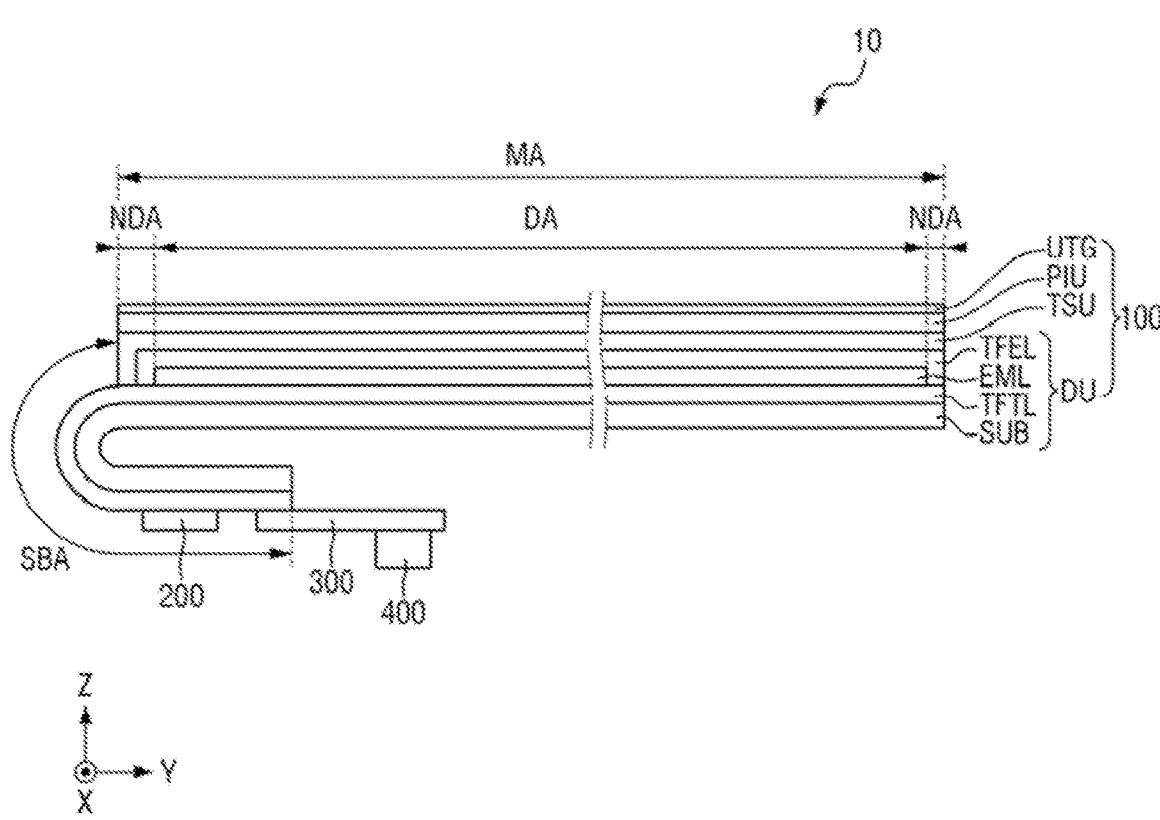
FIG. 4 is a cross-sectional view specifically illustrating the configuration of the display device illustrated in FIG. 2.

FIG. 3 is a perspective view illustrating a configuration of the display device illustrated in FIG. 2. FIG. 4 is a cross-sectional view illustrating the configuration of the display device illustrated in FIG. 2.

Referring to FIG. 3 and FIG. 4, the display device 10 may have a planar shape similar to a quadrangle. For example, the display device 10 may have a shape similar to a quadrilateral shape, in plan view, having short sides in an X-axis direction and long sides in a Y-axis direction. A corner where a short side in the X-axis direction and a long side in the Y-axis direction meet may be rounded to have a predetermined curvature or may be right-angled. The planar shape of the display device 10 is not limited to a quadrilateral shape, and may be formed in a shape similar to another polygonal shape, a circular shape, or elliptical shape.

The display panel 100 may include a main region MA and a sub-region SBA.

The main region MA may include a display area DA including pixels displaying an image. The main region MA may include a non-display area NDA disposed around the display area DA. The display area DA may be implemented in any of a variety of technologies. For example, the display area DA may include an emissive display that may emit light from a plurality of emission areas. In the example of the emissive display, the display panel 100 may include a pixel circuit including switching elements and a pixel defining layer defining an emission area. In another example, the display area DA may include a reflective display or a transmissive display including a plurality of opening areas. In the example of the transmissive display, the display panel 100 may include an opening area and a light emitting element.

The non-display area NDA may be an area outside the display area DA. The non-display area NDA may be an edge area of the main region MA of the display panel 100. The non-display area NDA may include a gate driver (not illustrated) that supplies gate signals to the gate lines, and fan-out lines (not illustrated) that connect the display driving unit 200 to the display area DA.

The sub-region SBA may extend from a side of the main region MA. The sub-region SBA may include a flexible material that can be bent, folded, or rolled. For example, when the sub-region SBA is bent, the sub-region SBA may overlap the main region MA in a thickness direction (Z-axis direction). The sub-region SBA may include the display driving unit 200 and the pad unit connected to the circuit board 300. Optionally, the sub-region SBA may be omitted, and the display driving unit 200 and the pad unit may be arranged in the non-display area NDA.

The display driving unit 200 may be formed as an integrated circuit (IC) and mounted on the display panel 100. For example, the display driving unit 200 may be mounted on the display panel 100 by a chip on glass (COG) method, a chip on plastic (COP) method, or an ultrasonic bonding method. The display driving unit 200 may be disposed in the sub-region SBA, and may overlap the main region MA in the thickness direction (Z-axis direction) by bending of the sub-region SBA. In another example, the display driving unit 200 may be mounted on the circuit board 300.

The circuit board 300 may be attached to the pad unit of the display panel 100 by using an anisotropic conductive film (ACF). Lead lines of the circuit board 300 may be electrically connected to a pad unit of the display panel 100. The circuit board 300 may be a flexible printed circuit board, a printed circuit board, or a flexible film such as a chip on film.

A touch driving unit 400 may be mounted on the circuit board 300. The touch driving unit 400 may be formed of an integrated circuit (IC). As described above, the touch driving unit 400 may supply a touch driving signal to a plurality of touch electrodes of the touch sensing unit TSU. The touch driving unit 400 may sense an amount of change in capacitance between the plurality of touch electrodes. Here, the touch driving signal may be a pulse signal having a predetermined frequency. The touch driving unit 400 may determine whether a touch of a user has been input and calculate touch coordinates, based on a change in capacitance between the plurality of touch electrodes.

Referring to FIG. 4, the display panel 100 may include a display unit DU, a touch sensing unit TSU, a code placement unit PIU, and at least one front protective cover UTG. The display unit DU may include a substrate SUB, a thin film transistor layer TFTL, a light emitting element layer EML, and an encapsulation layer TFEL.

The substrate SUB may be a base substrate or a base member. The substrate SUB may be a flexible substrate that can be bent, folded, or rolled. For example, the substrate SUB may include a glass material or a metal material, but is not limited thereto. In another example, the substrate SUB may include a polymer resin such as polyimide (PI).

The thin film transistor layer TFTL may be disposed on the substrate SUB. The thin film transistor layer TFTL may include a plurality of thin film transistors constituting a pixel circuit of pixels. The thin film transistor layer TFTL may further include gate lines, data lines, power lines, gate control lines, fan-out lines that connect the display driving unit 200 to the data lines, and lead lines that connect the display driving unit 200 to the pad unit. When the gate driver is formed on a side of the non-display area NDA of the display panel 100, the gate driver may also include thin film transistors.

The thin film transistor layer TFTL may be disposed in at least one of the display area DA, the non-display area NDA, or the sub-region SBA. Thin film transistors, gate lines, data lines, and power lines of each of the pixels of the thin film transistor layer TFTL may be disposed in the display area DA. Gate control lines and fan-out lines of the thin film transistor layer TFTL may be disposed in the non-display area NDA. The lead lines of the thin film transistor layer TFTL may be disposed in the sub-region SBA.

The light emitting element layer EML may be disposed on the thin film transistor layer TFTL. The light emitting element layer EML may include a plurality of light emitting elements in which a first electrode, a light emitting layer, and a second electrode are sequentially stacked to emit light, and a pixel defining layer defining pixels. The plurality of light emitting elements of the light emitting element layer EML may be disposed in the display area DA. The light emitting layer may be an organic light emitting layer containing an organic material. The light emitting layer may include a hole transporting layer, an organic light emitting layer, and an electron transporting layer. When the first electrode receives a predetermined voltage through the thin film transistor of the thin film transistor layer TFTL and the second electrode receives the cathode voltage, holes and electrons may be transferred to the organic light emitting layer through the hole transporting layer and the electron transporting layer, respectively, and may be combined with each other to emit light in the organic light emitting layer. For example, the first electrode may be an anode electrode, and the second electrode may be a cathode electrode. The present disclosure is not limited thereto, and different configurations are contemplated.

In another example, the plurality of light emitting elements may include a quantum dot light emitting diode including a quantum dot light emitting layer or an inorganic light emitting diode including an inorganic semiconductor.

An encapsulation layer TFEL may cover a top surface and a side surface of the light emitting element layer EML. The encapsulation layer TFEL may protect the light emitting element layer EML. The encapsulation layer TFEL may include at least one inorganic layer and at least one organic layer for encapsulating the light emitting element layer EML.

The touch sensing unit TSU may be disposed on the encapsulation layer TFEL. The touch sensing unit TSU may include a plurality of touch electrodes for sensing a user's touch in a capacitive manner, and touch lines electrically connecting the plurality of touch electrodes to the touch driving unit 400. For example, the touch sensing unit TSU may sense a user's touch by a self-capacitance method or a mutual capacitance method.

In another example, the touch sensing unit TSU may be disposed on a separate substrate disposed on the display unit DU. In this case, the substrate supporting the touch sensing unit TSU may be a base member that encapsulates the display unit DU.

The plurality of touch electrodes of the touch sensing unit TSU may be disposed in a touch sensor area overlapping the display area DA. The touch lines of the touch sensing unit TSU may be disposed in a peripheral area that overlaps the non-display area NDA. In an example in which the touch lines of the touch sensing unit TSO are display in the peripheral area that overlaps the non-display area NDA, the peripheral area may be a touch peripheral area.

The code placement unit PIU may include the code patterns formed at preset intervals. The code placement unit PIU in which the code patterns are formed may be arranged on the front surface of the touch sensing unit TSU. Specifically, a transparent insulating layer or a transparent layer may be formed on the front surface of the touch sensing unit TSU. Further, code patterns may be formed on the transparent insulating layer or the transparent layer to cover the front surfaces of some of the touch electrodes with a predetermined area. That is, positions of the code patterns may correspond to the positions of the touch electrodes on the transparent insulating layer or the transparent layer.

A pattern protection layer may be formed on the front surface of the transparent insulating layer or the transparent layer including the code patterns. The pattern protection layer may shield the code patterns. The pattern protection layer may be patterned according to the shapes and sizes of the code patterns to cover an entirety of code pattern, or may be formed to cover the front surface of the transparent insulating layer or the transparent layer including the code patterns. In this case, the pattern protection layer may be formed of a transparent protective material.

The pattern protection layer may cover and shield the entirety of the code pattern. For example, the pattern protection layer may protect the code patterns from an adhesive material or an adhesive layer that may be formed later. That is, the pattern protection layer may cover and shield the entirety of the code pattern, thereby reducing or preventing a change in a chemical component of the code pattern or a change in a chemical component of the code pattern over time.

An adhesive material or an adhesive layer may be formed on a front surface of the code placement unit PIU including the pattern protection layer. A front protective cover UTG may be attached to the front surface of the code placement unit PIU using the adhesive material or adhesive layer.

The sub-region SBA of the display panel 100 may extend from a side of the main region MA. The sub-region SBA may include a flexible material that can be bent, folded, or rolled. For example, when the sub-region SBA is bent, the sub-region SBA may overlap the main region MA in a thickness direction (Z-axis direction). The sub-region SBA may include the display driving unit 200 and the pad unit connected to the circuit board 300.

Figure 5:
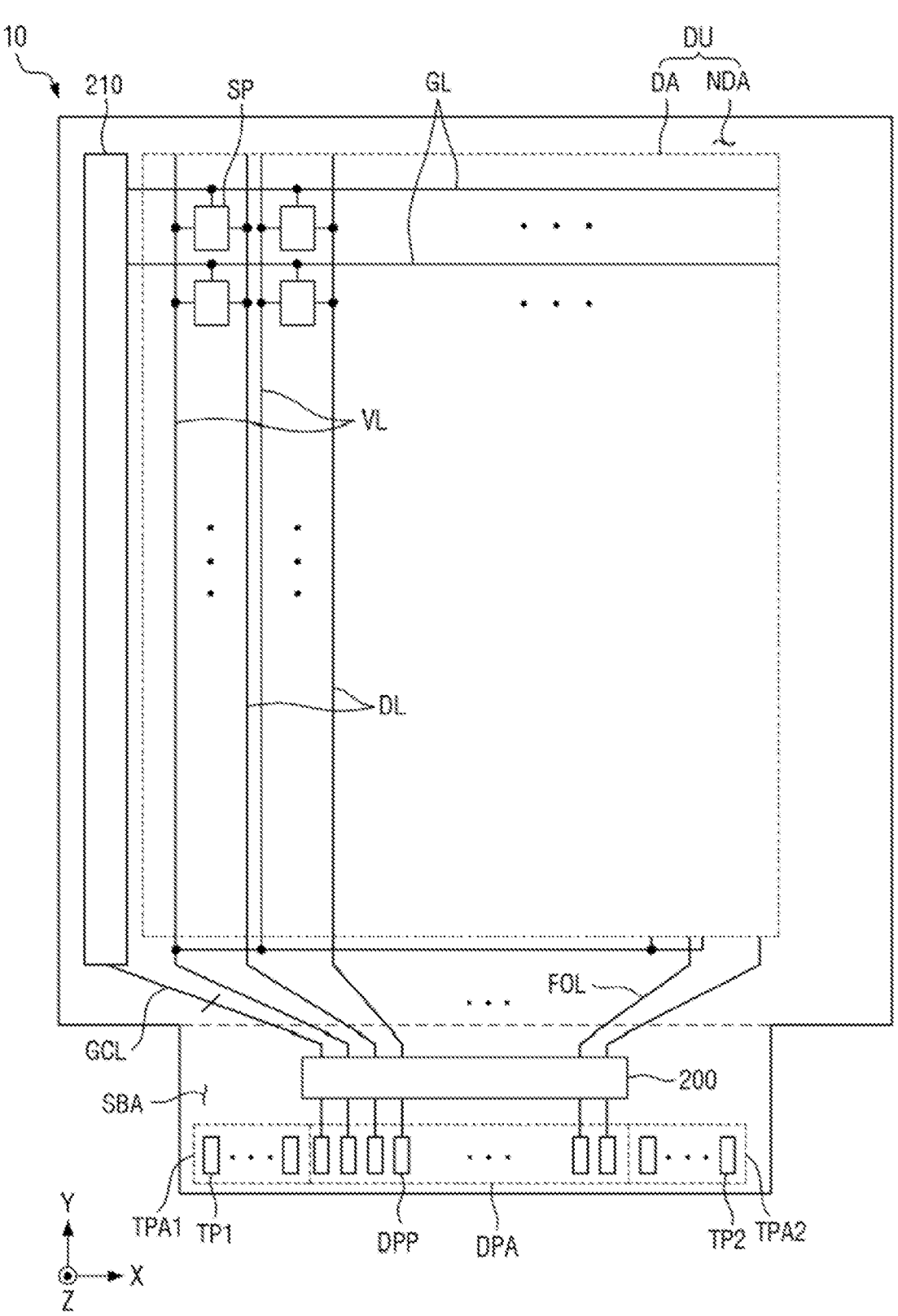
FIG. 5 is a plan view illustrating a display unit of a display device according to an embodiment.

FIG. 5 is a plan view illustrating a display unit of a display device according to an embodiment.

Referring to FIG. 5, in the display device 10, the display area DA of the display unit DU may be an area for displaying an image. The display area DA may be a central region of the display panel 100. The display area DA may include a plurality of pixels SP, a plurality of gate lines GL, a plurality of data lines DL, and a plurality of power lines VL. Each of the plurality of pixels SP may be a unit that outputs light.

The plurality of gate lines GL may supply gate signals from the gate driver 210 to the plurality of pixels SP. The plurality of gate lines GL may extend in the X-axis direction and may be spaced apart from each other in the Y-axis direction that crosses the X-axis direction.

The plurality of data lines DL may supply the data voltages from the display driving unit 200 to the plurality of pixels SP. The plurality of data lines DL may extend in the Y-axis direction and may be spaced apart from each other in the X-axis direction.

The plurality of power lines VL may supply the power voltage from the display driving unit 200 to the plurality of pixels SP. Here, the power voltage may be at least one of a driving voltage, an initialization voltage, or a reference voltage. The plurality of power lines VL may extend in the Y-axis direction and may be spaced apart from each other in the X-axis direction.

The non-display area NDA of the display unit DU may surround the display area DA. The non-display area NDA may include a gate driver 210, fan-out lines FOL, and gate control lines GCL. The gate driver 210 may generate a plurality of gate signals. The plurality of gate signals may be generated based on the gate control signal. The plurality of gate signals may sequentially supply the plurality of gate signals to the plurality of gate lines GL according to a set order.

The fan-out lines FOL may extend from the display driving unit 200 to the display area DA. The fan-out lines FOL may supply the data voltage from the display driving unit 200 to the plurality of data lines DL.

The gate control line GCL may extend from the display driving unit 200 to the gate driver 210. The gate control line GCL may supply the gate control signal from the display driving unit 200 to the gate driver 210.

The sub-region SBA may include the display driving unit 200, a display pad area DPA, and a first touch pad area TPA1 and a second touch pad area TPA2.

The display driving unit 200 may output signals and voltages for driving the display panel 100 to the fan-out lines FOL. The display driving unit 200 may supply a data voltage to the data line DL through the fan-out lines FOL. The data voltage may be supplied to the plurality of pixels SP to determine a luminance of light output by the plurality of pixels SP. The display driving unit 200 may supply the gate control signal to the gate driver 210 through the gate control line GCL.

The display pad area DPA, the first touch pad area TPA1, and the second touch pad area TPA2 may be disposed at an edge of the sub-region SBA. The display pad area DPA, the first touch pad area TPA1, and the second touch pad area TPA2 may be electrically connected to the circuit board 300 by an anisotropic conductive layer or a low-resistance high-reliability material formed by a Semi-Additive Process (SAP).

The display pad area DPA may include a plurality of display pad units DPP. The plurality of display pad units DPP may be connected to the main processor 500 through the circuit board 300. The plurality of display pad units DPP may be connected to the circuit board 300 to receive digital video data, and may supply the digital video data to the display driving unit 200.

Figure 6:
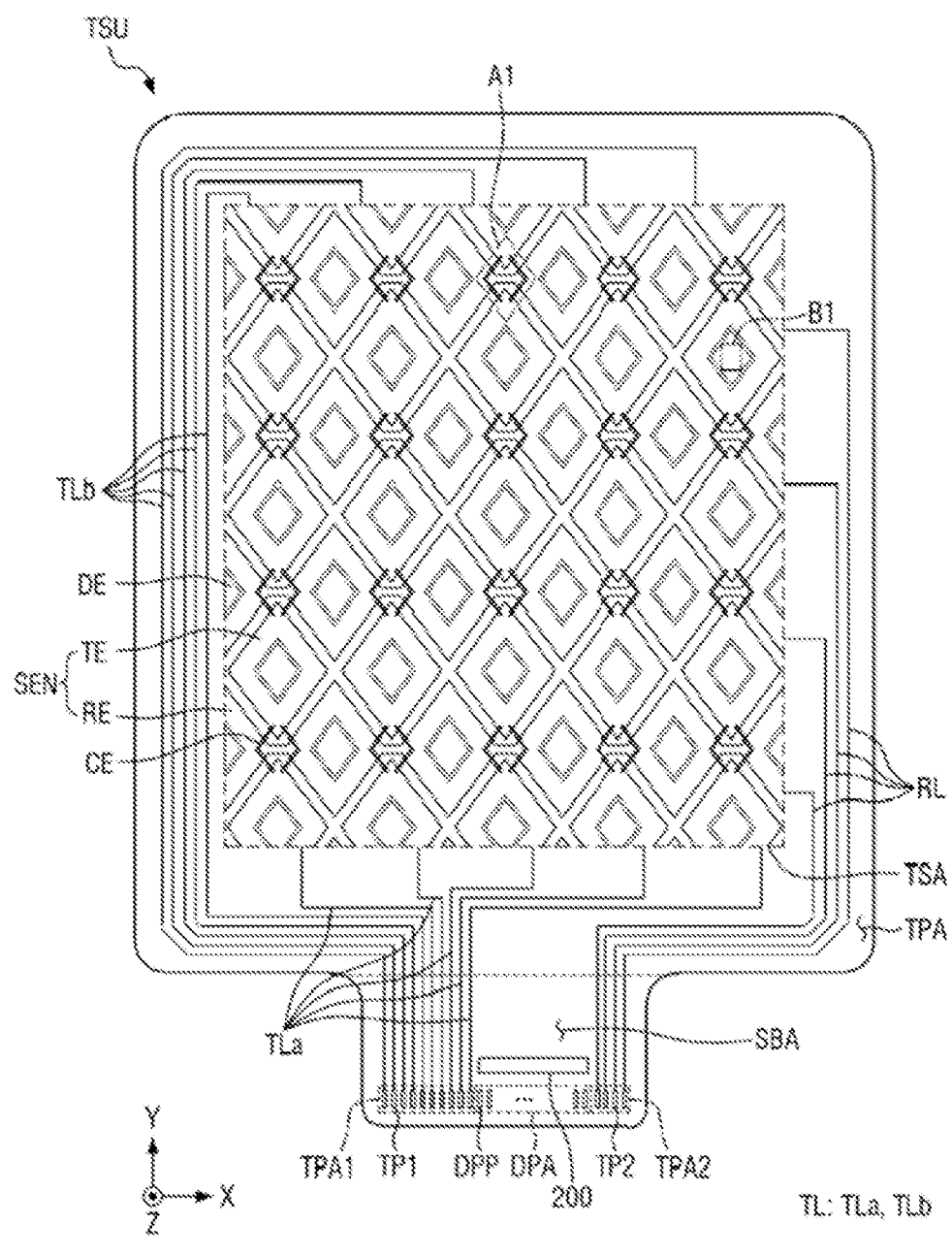
FIG. 6 is a plan view illustrating a touch sensing unit of a display device according to an embodiment.

FIG. 6 is a plan view illustrating a touch sensing unit of a display device according to an embodiment.

Referring to FIG. 6, the touch sensing unit TSU may include a touch sensor area TSA for sensing a user's touch. The touch sensing unit TSU may include a touch peripheral area TPA disposed around the touch sensor area TSA. The touch sensor area TSA may overlap the display area DA of the display unit DU, and the touch peripheral area TPA may overlap the non-display area NDA of the display unit DU.

The touch sensor area TSA may include a plurality of touch electrodes SEN and a plurality of dummy electrodes DE. The plurality of touch electrodes SEN may be configured to sense a touch of an object or a person. For example, the plurality of touch electrodes SEN may be mutual capacitance sensors or self-capacitance sensors. The plurality of touch electrodes SEN may include a plurality of driving electrodes TE and a plurality of sensing electrodes RE.

The plurality of driving electrodes TE may be arranged in the X-axis direction and the Y-axis direction. The plurality of driving electrodes TE may be spaced apart from each other in the X-axis direction and the Y-axis direction. The driving electrodes TE adjacent in the Y-axis direction may be electrically connected through a plurality of connection electrodes CE.

The plurality of driving electrodes TE may be connected to a first touch pad unit TP1 through a driving line TL. The driving line TL may include lower driving lines TLa and upper driving lines TLb. For example, some electrodes of the driving electrodes TE may be disposed under the touch sensor area TSA and may be connected to the first touch pad unit TP1 through the lower driving lines TLa, and other electrodes of the driving electrodes TE may be disposed on the upper side of the touch sensor area TSA and may be connected to the first touch pad unit TP1 through the upper driving lines TLb. The lower driving lines TLa may extend to the first touch pad unit TP1 through a lower side of the touch peripheral area TPA. The upper driving lines TLb may extend to the first touch pad unit TP1 through one or more of an upper side, a left side, or the lower side of the touch peripheral area TPA. The first touch pad unit TP1 may be connected to the touch driving unit 400 through the circuit board 300.

The connection electrode CE may include a bent portion. For example, the connection electrode CE may have an angle bracket shape ("<" or ">"). The planar shape of the connection electrode CE is not limited thereto, and the connection electrode CE may have other shapes. The driving electrodes TE adjacent to each other in the Y-axis direction may be electrically connected by a plurality of connection electrodes CE. In a case that any one of the connection electrodes CE may be disconnected, the driving electrodes TE may be stably connected through one or more remaining connection electrodes CE. The driving electrodes TE adjacent to each other may be connected by two connection electrodes CE, but the number of connection electrodes CE connecting the driving electrodes TE is not limited thereto.

The connection electrode CE may be disposed on a different layer from the plurality of driving electrodes TE and the plurality of sensing electrodes RE. The sensing electrodes RE adjacent in the X-axis direction may be electrically connected through a connection portion disposed on a same layer as the plurality of driving electrodes TE or the plurality of sensing electrodes RE. That is, the plurality of sensing electrodes RE may extend in the X-axis direction and may be spaced apart from each other in the Y-axis direction. The plurality of sensing electrodes RE may be arranged in the X-axis direction and the Y-axis direction, and the sensing electrodes RE adjacent in the X-axis direction may be electrically connected through the connection portion.

The driving electrodes TE adjacent in the Y-axis direction may be electrically connected through the connection electrodes CE disposed on a different layer from the plurality of driving electrodes TE or the plurality of sensing electrodes RE. The connection electrodes CE may be formed on a rear surface layer (or a lower layer) of a layer on which the driving electrodes TE and the sensing electrodes RE are formed. The connection electrodes CE may be electrically connected to the driving electrodes TE through a plurality of contact holes. For example, one of the connection electrodes CE may be connected to a pair of adjacent driving electrodes of the driving electrodes TE through contact holes. Accordingly, the connection electrodes CE may overlap the plurality of sensing electrodes RE in the Z-axis direction, and the plurality of driving electrodes TE and the plurality of sensing electrodes RE may be insulated from each other. In an example mutual capacitance sensor, a mutual capacitance formed between the driving electrode TE and the sensing electrode RE may be measured.

The plurality of sensing electrodes RE may be connected to the second touch pad unit TP2 through a sensing line RL. For example, some of the sensing electrodes RE disposed on a right side of the touch sensor area TSA may be connected to the second touch pad unit TP2 through the sensing line RL. The sensing line RL may extend to the second touch pad unit TP2 through the right side and the lower side of the touch peripheral area TPA. The second touch pad unit TP2 may be connected to the touch driving unit 400 through the circuit board 300.

Each of the plurality of dummy electrodes DE may be surrounded by the driving electrode TE or the sensing electrode RE. Each of the dummy electrodes DE may be insulated from the driving electrode TE or the sensing electrode RE. For example, a dummy electrode of the dummy electrodes may be spaced apart from a surrounding driving electrode of the driving electrodes TE or a surrounding sensing electrode of the sensing electrodes RE. Accordingly, the dummy electrode DE may be electrically floating.

Each grid pattern may be formed in such a way that at least one of the plurality of driving electrodes TE, the plurality of sensing electrodes RE, or the plurality of dummy electrodes DE protrudes from each grid reference point position. In addition, a plurality of grid patterns may be formed to be separated from at least one of the plurality of driving electrodes TE, the plurality of sensing electrodes RE, and the plurality of dummy electrodes DE at each grid reference point position. Also, the code patterns having a planar shape may be formed at predetermined intervals on partial regions of a front surface of at least one electrode of the plurality of driving electrodes TE, the plurality of sensing electrodes RE, or the plurality of dummy electrodes DE.

The display pad area DPA, the first touch pad area TPA1, and the second touch pad area TPA2 may be disposed at the edge of the sub-region SBA. The display pad area DPA, the first touch pad area TPA1, and the second touch pad area TPA2 may be electrically connected to the circuit board 300 by an anisotropic conductive layer or a low-resistance high-reliability material formed by a SAP.

The first touch pad area TPA1 may be disposed on a side of the display pad area DPA, and may include a plurality of first touch pad units TP1. The plurality of first touch pad units TP1 may be electrically connected to the touch driving unit 400 disposed on the circuit board 300. The plurality of first touch pad units TP1 may supply a touch driving signal to the plurality of driving electrodes TE through a plurality of driving lines TL.

The second touch pad area TPA2 may be disposed on a side of the display pad area DPA, and may include a plurality of second touch pad units TP2. The second touch pad area TPA2 may be disposed on an opposite side from the first touch pad area TPA1. The plurality of second touch pad units TP2 may be electrically connected to the touch driving unit

400 disposed on the circuit board 300. The touch driving unit 400 may receive a touch sensing signal through a plurality of sensing lines RL connected to the plurality of second touch pad units TP2, and may sense a change in the mutual capacitance between the driving electrode TE and the sensing electrode RE.

As another example, the touch driving unit 400 may supply a touch driving signal to each of the plurality of driving electrodes TE and the plurality of sensing electrodes RE, and may receive a touch sensing signal from each of the plurality of driving electrodes TE and the plurality of sensing electrodes RE. The touch driving unit 400 may sense an amount of change in electric charge of each of the plurality of driving electrodes TE and the plurality of sensing electrodes RE based on the touch sensing signal.

Figure 7:
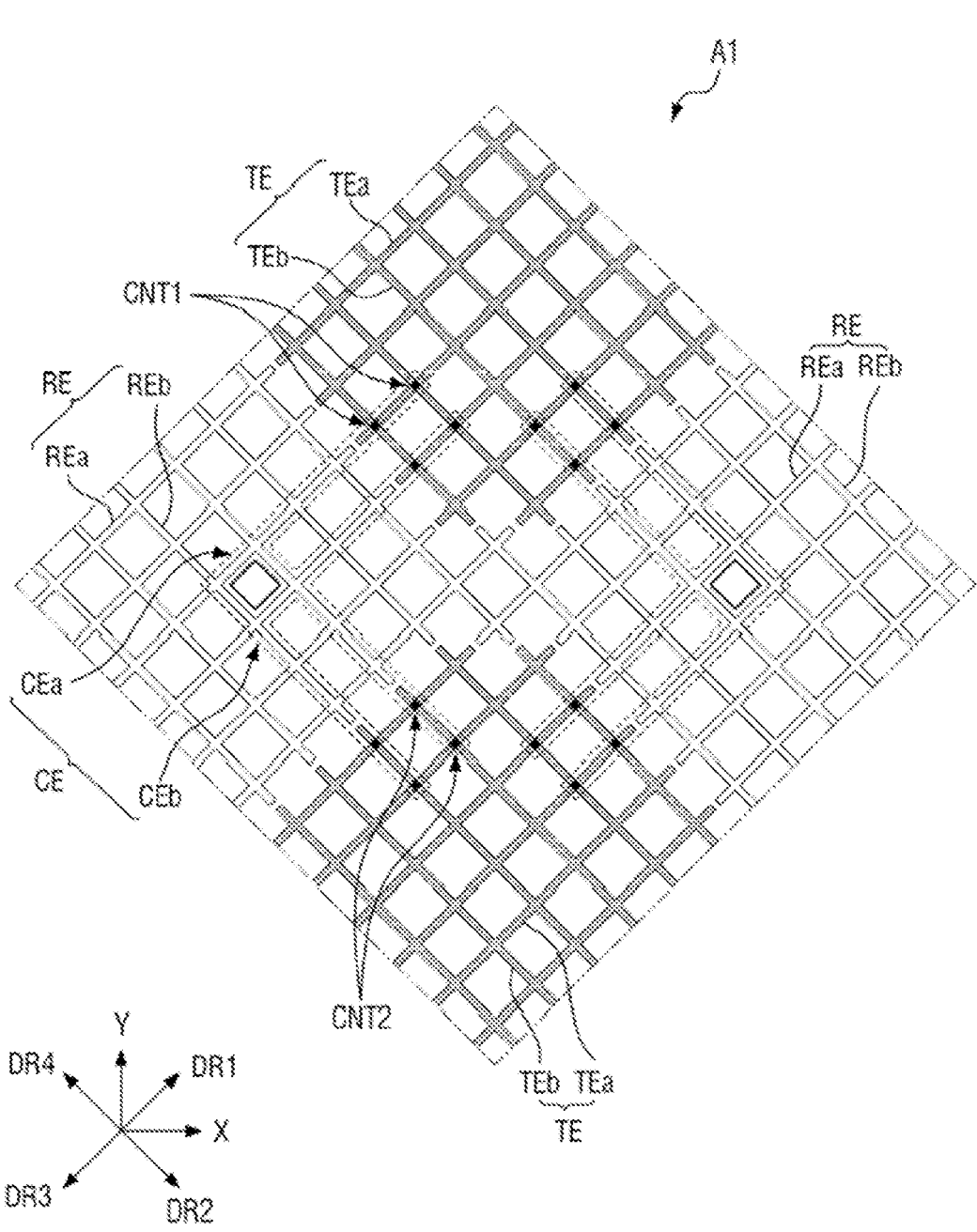
FIG. 7 is an enlarged view illustrating area A1 of FIG. 6.
Figure 8:
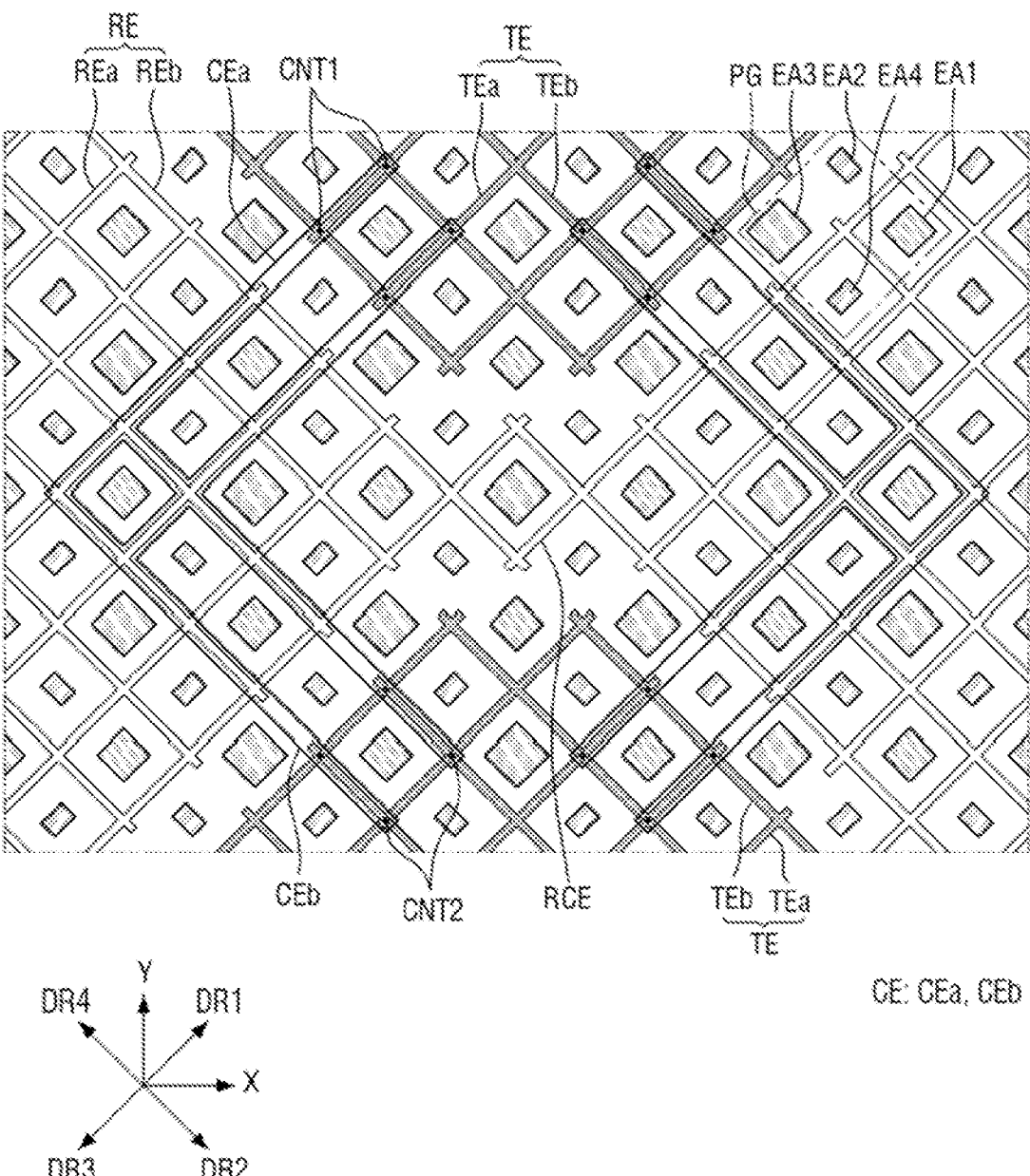
FIG. 8 is an enlarged view specifically illustrating a connection portion structure of connection electrode and sensing electrodes of FIG. 7.

FIG. 7 is an enlarged view illustrating area A1 of FIG. 6. FIG. 8 is an enlarged view illustrating a connection portion structure of a connection electrode and a sensing electrode of FIG. 7.

Referring to FIG. 7 and FIG. 8, the plurality of driving electrodes TE, the plurality of sensing electrodes RE, and the plurality of dummy electrodes DE may be disposed on the same layer and may be spaced apart from each other.

The plurality of driving electrodes TE may be arranged in the X-axis direction and the Y-axis direction. The plurality of driving electrodes TE may be spaced apart from each other in the X-axis direction and the Y-axis direction. The driving electrodes TE adjacent in the Y-axis direction may be electrically connected through the connection electrode CE.

The plurality of sensing electrodes RE may extend in the X-axis direction and may be spaced apart from each other in the Y-axis direction. The plurality of sensing electrodes RE may be arranged in the X-axis direction and the Y-axis direction, and the sensing electrodes RE adjacent in the X-axis direction may be electrically connected. For example, the sensing electrodes RE may be electrically connected through a connection portion. The connection portion may be disposed between the driving electrodes TE adjacent to each other. The connection portion may be disposed across a shortest distance between the driving electrodes TE adjacent to each other.

The plurality of connection electrodes CE may be disposed on a layer different from the driving electrode TE and the sensing electrode RE. For example, the plurality of connection electrodes CE may be disposed on a rear surface layer. The connection electrode CE may include a first portion CEa and a second portion CEb. For example, the first portion CEa of the connection electrode CE may be connected to the driving electrode TE disposed on a first side through a first contact hole CNT1 and may extend in a third direction DR3. The second portion CEb of the connection electrode CE may be bent from the first portion CEa in an area overlapping the sensing electrode RE to extend in a second direction DR2, and may be connected to the driving electrode TE disposed on a second side through a second contact hole CNT2. The first contact hole CNT1 and the second contact hole CNT2 may each include a plurality of contact holes.

Hereinafter, a first direction DR1 may be a direction between the X-axis direction and the Y-axis direction, the second direction DR2 may be a direction between the opposite direction of the Y-axis direction and the X-axis direction, the third direction DR3 may be an opposite direction of the first direction DR1, and a fourth direction DR4 may be an opposite direction of the second direction DR2. Accordingly, each of the plurality of connection electrodes CE may connect the adjacent driving electrodes TE in the Y-axis direction.

Each pixel group PG may include first to third sub-pixels or first to fourth sub-pixels. Each of the first to fourth sub-pixels may include a first emission area EA1, a second emission area EA2, a third emission area EA3, and a fourth emission area EA4. For example, the first emission area EA1 may emit light of a first color or red light, the second emission area EA2 may emit light of a second color or green light, and the third emission area EA3 may emit light of a third color or blue light. Further, the fourth emission area EA4 may emit light of a fourth color or light of any one of the first to third colors. The present disclosure is not limited thereto and the pixel groups may be configured in various ways, for example, with emission area configured to emit a different set of colors.

A pixel group PG may express a gray level through the first to third emission areas EA1 to EA3. A pixel group PG may express a gray level through the first to fourth emission areas EA1, EA2, EA3, and EA4. Further, gray levels of various colors such as white light or the like may be expressed by a combination of light emitted from the first to third emission areas EA1 to EA3 or by a combination of light emitted from the first to fourth emission areas EA1 to EA4.

Depending on a placement structure of the first to third sub-pixels or the first to fourth sub-pixels, the plurality of driving electrodes TE, the plurality of sensing electrodes RE, and the plurality of dummy electrodes DE may be formed in a mesh structure or a net structure in plan view.

The plurality of driving electrodes TE, the plurality of sensing electrodes RE, and the plurality of dummy electrodes DE may surround spaces between the first to third emission areas EA1 to EA3 or spaces between the first to fourth emission areas EA1 to EA4 constituting the pixel group PG and the outer sides thereof in plan view. Accordingly, the plurality of driving electrodes TE, the plurality of sensing electrodes RE, and the plurality of dummy electrodes DE may not overlap first to fourth emission areas EA1 to EA4. The plurality of connection electrodes CE may also not overlap the first to fourth emission areas EA1 to EA4. Accordingly, the display device 10 may prevent or moderate a reduction of the luminance of light emitted from the first to fourth emission areas EA1 to EA4 by the touch sensing unit TSU.

Each of the plurality of driving electrodes TE may include a first portion TEa extending in the first direction DR1 and a second portion TEb extending in the second direction DR2. The first portions TEa and the second portions TEb of the driving electrodes TE may not overlap the first to fourth emission areas EA1 to EA4. Further, each of the plurality of sensing electrodes RE may include a first portion REa extending in the first direction DR1 and a second portion REb extending in the second direction DR2. The first portions REa and the second portions Reb of the sensing electrodes RE may not overlap the first to fourth emission areas EA1 to EA4. While not illustrated in FIG. 7 and FIG. 8, the plurality of dummy electrodes DE may be formed apart from the first to fourth emission areas EA1 to EA4. That is, the plurality of dummy electrodes DE may be formed so as not to overlap the first to fourth emission areas EA1 to EA4.

Figure 9:
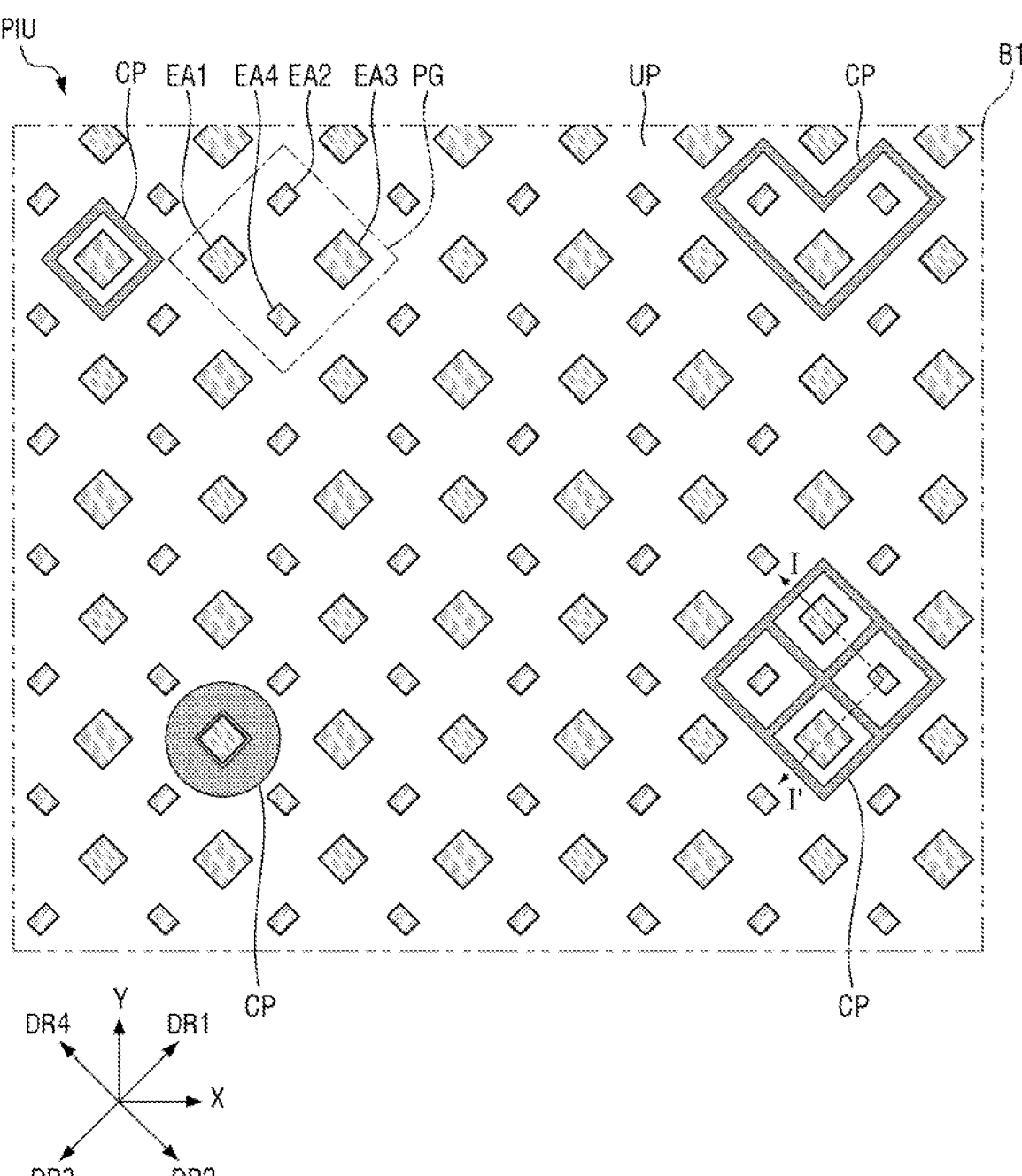
FIG. 9 is an enlarged view illustrating a code pattern placement structure of a code placement unit formed in area B1 of FIG. 6.

FIG. 9 is an enlarged view illustrating a code pattern placement structure of a code placement unit formed in area B1 of FIG. 6.

Referring to FIG. 9, the code placement unit PIU may include a transparent insulating layer UP or a transparent layer, code patterns CP, and a pattern protection layer disposed on the front surface of the touch sensing unit TSU (see FIG. 4).

Specifically, the transparent insulating layer UP or a transparent layer may be placed on the front surface of the touch sensing unit TSU, which may include touch electrodes SEN, on the front surface dummy electrodes DE, and on the first to fourth emission areas EA1, EA2, EA3, and EA4.

Code patterns CP are formed on the transparent insulating layer UP or the transparent layer. For example, a first code pattern of the code patterns CP on the transparent insulating layer UP may be formed to partially cover at least one electrode of the touch electrodes SEN and the dummy electrodes DE. That is, the code patterns CP are formed to partially cover the plurality of dummy electrodes DE, the plurality of driving electrodes TE, and the plurality of sensing electrodes RE with the transparent insulating layer UP interposed therebetween.

The code patterns CP formed on the transparent insulating layer UP may be formed in a planar code shape or a planar code pattern shape having a predetermined size. The code patterns CP may be formed to change, reduce, or minimize a reflectance of infrared light by blocking or absorbing the infrared light applied from the position input device 20. The code patterns CP may be recognized as the code pattern CP by the position input device 20 according to the planar code shape in which infrared light reflectance is changed, reduced, or minimized.

The planar code shape of the code patterns CP may be at least one polygonal pattern shape selected among a rectangle, a square, a circle, a semicircle, a sector, or a rhombus, or may be a pattern shape in which a plurality of polygonal pattern shapes are combined. Further, the planar code shape of the code patterns CP may be a polygonal closed loop pattern shape such as a rectangle, a square, a rhombus, a pentagon, a hexagon, or the like which surrounds at least one emission area. Alternatively, the planar code shape of the code patterns CP may be an open loop pattern shape partially surrounding at least one emission area. Further, the planar code shape of the code patterns CP may be a straight shape or a curved shape of a certain length. On the other hand, when the code patterns CP do not surround an emission area, the code patterns CP may surround the spaces between the plurality of emission areas and the outer sides thereof, the code patterns CP may have a shape of a mesh pattern structure or a net pattern structure in plan view.

As described above, the code patterns CP may be formed of the light blocking member and may absorb or block external light incident on the front surface. The touch electrodes SEN on which the code patterns are not formed may reflect the external light incident on the front surface back to the front surface. Accordingly, the pattern width or width of the touch electrodes SEN overlapping or corresponding to the code pattern CP may be wider than a width of the code pattern CP. In addition, areas of the touch electrodes SEN and the dummy electrodes DE may be greater than areas of the code patterns CP overlapping or corresponding to the front surface thereof.

A pattern protection layer for shielding the code patterns CP may be formed on the front surface of the transparent insulating layer UP or the transparent layer including the code patterns CP. The pattern protection layer may be patterned according to the shape and size of the code patterns CP and may cover an entirety of the code patterns CP, or may be formed to cover the front surface of the transparent insulating layer UP or the transparent layer including the code patterns CP. In this case, the pattern protection layer may be formed of a transparent protective material.

Hereinafter, a description of a laminated structure of a code placement unit PIU will be described in detail. The laminated structure of the code placement unit PIU may include code patterns CP patterned on a transparent insulating layer UP or a transparent layer, and a pattern protection layer formed on the transparent insulating layer UP or the transparent layer including the code patterns CP.

Figure 10:
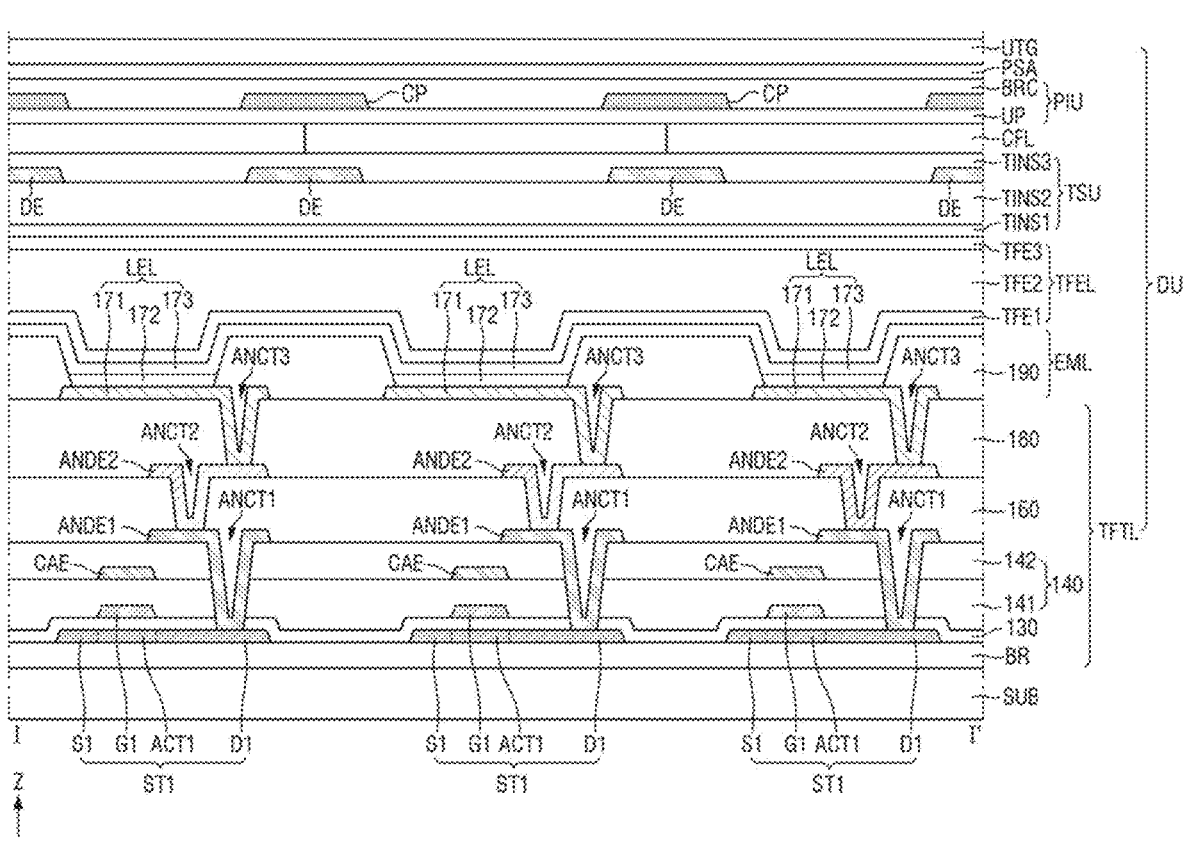
FIG. 10 is a cross-sectional view of a cross section of I-I' of FIG. 9 according to a first embodiment.
Figure 11:
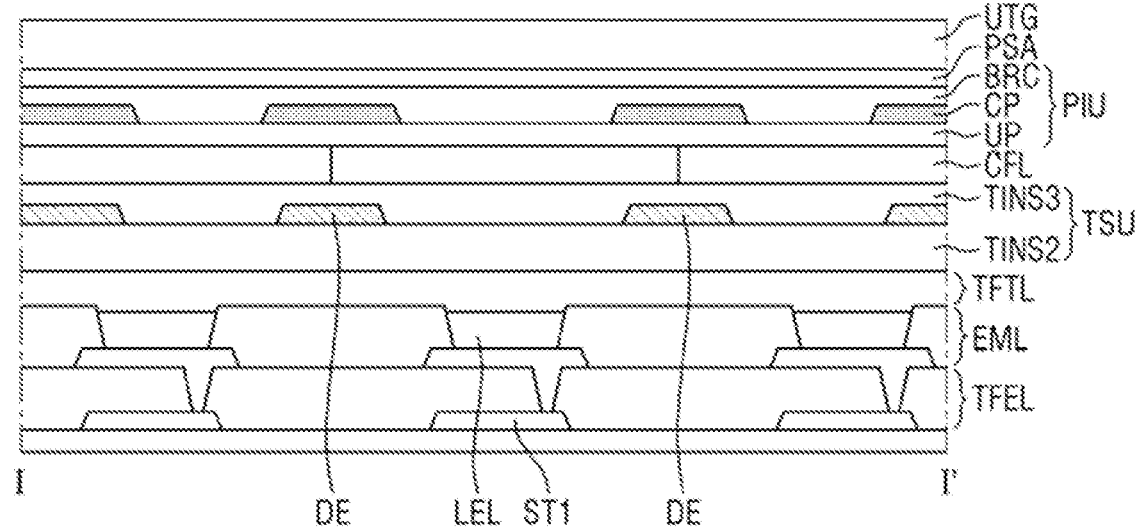
FIG. 11 is a cross-sectional view schematically showing the cross-sectional structure taken along line I-I' of FIG. 10.

FIG. 10 is a cross-sectional view of a cross section of I-I' of FIG. 9 according to a first embodiment. FIG. 11 is a cross-sectional view schematically showing the cross-sectional structure taken along line I-I'.

Referring to FIG. 10 and FIG. 11, a barrier layer BR may be disposed on the substrate SUB. The substrate SUB may be formed of an insulating material such as polymer resin. For example, the substrate SUB may be formed of polyimide. The substrate SUB may be a flexible substrate. The substrate SUB may be bent, folded, or rolled.

The barrier layer BR may be a layer for protecting transistors of the thin film transistor layer TFTL and a light emitting layer 172 of the light emitting element layer EML. The barrier layer BR may protect transistors of the thin film transistor layer TFTL and the light emitting layer 172 of the light emitting element layer EML from moisture permeating through the substrate SUB, which may be susceptible to moisture permeation. The barrier layer BR may be formed as a plurality of inorganic layers. For example, the barrier layer BR may be formed of multiple layers in which one or more inorganic layers of a silicon nitride layer, a silicon oxynitride layer, a silicon oxide layer, a titanium oxide layer or an aluminum oxide layer may be alternately stacked.

Thin film transistors ST1 may be disposed on the barrier layer BR. Each of the thin film transistors ST1 may include an active layer ACT1, a gate electrode G1, a source electrode S1, and a drain electrode D1.

The active layer ACT1, the source electrode S1, and the drain electrode D1 of the thin film transistors ST1 may be disposed on the barrier layer BR. The active layer ACT1 of the thin film transistor ST1 may include polycrystalline silicon, monocrystalline silicon, low-temperature polycrystalline silicon, amorphous silicon, or an oxide semiconductor. The active layer ACT1 overlapping the gate electrode G1 in the third direction (Z-axis direction), that is the thickness direction of the substrate SUB, may be a channel region. The source electrode S1 and the drain electrode D1 that do not overlap the gate electrode G1 in the third direction (Z-axis direction) may be conductive. For example, the source electrode S1 and the drain electrode D1 that do not overlap the gate electrode G1 in the third direction (Z-axis direction) may be a silicon semiconductor or an oxide semiconductor doped with ions or impurities.

A gate insulating layer 130 may be disposed on the active layer ACT 1, the source electrode S1, and the drain electrode D1 of the thin film transistor ST1. The gate insulating layer 130 may be formed of an inorganic layer, for example, a silicon nitride layer, a silicon oxynitride layer, a silicon oxide layer, a titanium oxide layer, or an aluminum oxide layer.

The gate electrode G1 of the thin film transistor ST1 may be arranged on the gate insulating layer 130. The gate electrode G1 may overlap the active layer ACT1 in the third direction (Z-axis direction). The gate electrode G1 may be formed as a single layer or multiple layers made of molybdenum (Mo), aluminum (Al), chromium (Cr), gold (Au), titanium (Ti), nickel (Ni), neodymium (Nd) or copper (Cu), or an alloy thereof.

A first interlayer insulating layer 141 may be disposed on the gate electrode G1 of the thin film transistor ST1. The first interlayer insulating layer 141 may be formed of an inorganic layer, for example, a silicon nitride layer, a silicon oxynitride layer, a silicon oxide layer, a titanium oxide layer, or an aluminum oxide layer. The first interlayer insulating layer 141 may be formed of a plurality of inorganic layers.

A capacitor electrode CAE may be disposed on the first interlayer insulating layer 141. The capacitor electrode CAE may overlap the gate electrode G1 of the first thin film transistor ST1 in the third direction (Z-axis direction). The first interlayer insulating layer 141 may be a predetermined dielectric constant, and the capacitor electrode CAE, the gate electrode G1, and the first interlayer insulating layer 141 disposed therebetween may form a capacitor. The capacitor electrode CAE may be formed as a single layer or multiple layers made of molybdenum (Mo), aluminum (Al), chromium (Cr), gold (Au), titanium (Ti), nickel (Ni), neodymium (Nd) or copper (Cu), or an alloy thereof.

A second interlayer insulating layer 142 may be disposed on the capacitor electrode CAE. The second interlayer insulating layer 142 may be formed of an inorganic layer, for example, a silicon nitride layer, a silicon oxynitride layer, a silicon oxide layer, a titanium oxide layer, or an aluminum oxide layer. The second interlayer insulating layer 142 may be formed of a plurality of inorganic layers.

A first anode connection electrode ANDE1 may be disposed on the second interlayer insulating layer 142. The first anode connection electrode ANDE1 may be connected to the drain electrode D1 of the thin film transistor ST1 through a first connection contact hole ANCT1 penetrating the gate insulating layer 130, the first interlayer insulating layer 141, and the second interlayer insulating layer 142. The first anode connection electrode ANDE1 may be formed as a single layer or multiple layers made of molybdenum (Mo), aluminum (Al), chromium (Cr), gold (Au), titanium (Ti), nickel (Ni), neodymium (Nd) or copper (Cu), or an alloy thereof.

A first planarization layer 160 may be disposed on the first anode connection electrode ANDE1. The first planarization layer 160 may be formed of an organic layer such as acryl resin, epoxy resin, phenolic resin, polyamide resin, polyimide resin or the like.

A second anode connection electrode ANDE2 may be disposed on the first planarization layer 160. The second anode connection electrode ANDE2 may be connected to the first anode connection electrode ANDE1 through a second connection contact hole ANCT2 penetrating the first planarization layer 160. The second anode connection electrode ANDE2 may be formed as a single layer or multiple layers made of molybdenum (Mo), aluminum (Al), chromium (Cr), gold (Au), titanium (Ti), nickel (Ni), neodymium (Nd) or copper (Cu), or an alloy thereof.

The second planarization layer 180 may be disposed on the second anode connection electrode ANDE2. The second planarization layer 180 may be formed of an organic layer such as acryl resin, epoxy resin, phenolic resin, polyamide resin, polyimide resin or the like.

Light emitting elements LEL and a bank 190 may be disposed on the second planarization layer 180. Each of the light emitting elements LEL may include a pixel electrode 171, the light emitting layer 172, and a common electrode 173.

The pixel electrode 171 may be disposed on the second planarization layer 180. The pixel electrode 171 may be connected to a second anode connection electrode ANDE2 through a third connection contact hole ANCT3 penetrating the second planarization layer 180.

In a top emission structure in which light may be emitted toward the common electrode 173 when viewed with respect to the light emitting layer 172, the pixel electrode 171 may be formed of a metal material having high reflectivity. The pixel electrode 171 may have a stacked structure (Ti/Al/Ti) of aluminum and titanium, a stacked structure (ITO/Al/ITO) of aluminum and indium tin oxide (ITO), an APC alloy, or a stacked structure (ITO/APC/ITO) of an APC alloy and ITO. The APC alloy may be an alloy of silver (Ag), palladium (Pd) and copper (Cu).

The bank 190 may be formed to partition the pixel electrode 171 from the second planarization layer 180 and define the first to third emission areas EA1 to EA3. The bank 190 may be disposed to cover the edge of the pixel electrode 171. The bank 190 may be formed of an organic layer such as acryl resin, epoxy resin, phenolic resin, polyamide resin, polyimide resin or the like.

Each of the first to third emission areas EA1 to EA3 may represent an area in which the pixel electrode 171, the light emitting layer 172, and the common electrode 173 are sequentially stacked, and holes from the pixel electrode 171 and electrons from the common electrode 173 may be combined with each other in the light emitting layer 172 to emit light.

The light emitting layer 172 may be disposed on the pixel electrode 171 and the bank 190. The light emitting layer 172 may include an organic material capable of emitting light of a predetermined color. For example, the light emitting layer 172 may include a hole transporting layer, an organic material layer, and an electron transporting layer.

The common electrode 173 may be disposed on the light emitting layer 172. The common electrode 173 may be disposed to cover the light emitting layer 172. The common electrode 173 may be a common layer of the first emission area EA1, the second emission area EA2, and the third emission area EA3. A capping layer may be formed on the common electrode 173.

In the top emission structure, the common electrode 173 may be formed of a transparent conductive material (TCO) such as ITO or IZO capable of transmitting light. The common electrode 173 may be formed of a semi-transmissive conductive material such as magnesium (Mg), silver (Ag), or an alloy of magnesium (Mg) and silver (Ag). When the common electrode 173 is formed of a semi-transmissive conductive material, the light emission efficiency may be increased due to a micro-cavity effect.

The encapsulation layer TFEL may be disposed on the common electrode 173. The encapsulation layer TFEL may include at least one inorganic layer. The inorganic layer may be reduce or prevent oxygen or moisture from permeating into the light emitting element layer EML. In addition, the encapsulation layer TFEL may include at least one organic layer. The organic layer may protect the light emitting element layer EML from foreign substances such as dust. For example, the encapsulation layer TFEL may include a first encapsulation inorganic layer TFE1, a second encapsulation organic layer TFE2, and a third encapsulation inorganic layer TFE3.

The first encapsulation inorganic layer TFE1 may be disposed on the common electrode 173, the second encapsulation organic layer TFE2 may be disposed on the first encapsulation inorganic layer TFE1, and the third encapsulation inorganic layer TFE3 may be disposed on the second encapsulation organic layer TFE2. The first encapsulation inorganic layer TFE1 and the third encapsulation inorganic layer TFE3 may be formed of multiple layers in which one or more inorganic layers of a silicon nitride layer, a silicon oxynitride layer, a silicon oxide layer, a titanium oxide layer or an aluminum oxide layer may be alternately stacked. The second encapsulation organic layer TFE2 may be an organic layer such as acryl resin, epoxy resin, phenolic resin, poly-amide resin, polyimide resin or the like.

The touch sensing unit TSU shown in FIG. 6 may be disposed on the encapsulation layer TFEL. The touch sens-ing unit TSU may include a first touch insulating layer TINS1, the connection electrode CE, a second touch insu-lating layer TINS2, the driving electrode TE, the sensing electrode RE, the dummy electrodes DE, and a third touch insulating layer TINS3.

The first touch insulating layer TINS1 may be formed of an inorganic layer, for example, a silicon nitride layer, a silicon oxynitride layer, a silicon oxide layer, a titanium oxide layer, or an aluminum oxide layer.

The connection electrode CE may be disposed on the first touch insulating layer TINS1. The connection electrode CE may be formed as a single layer or multiple layers made of molybdenum (Mo), aluminum (Al), chromium (Cr), gold (Au), titanium (Ti), nickel (Ni), neodymium (Nd) or copper (Cu), or an alloy thereof.

The second touch insulating layer TINS2 may be disposed on the first touch insulating layer TINS1, which may include the connection electrodes CE. The second touch insulating layer TINS2 may be formed of an inorganic layer, for example, a silicon nitride layer, a silicon oxynitride layer, a silicon oxide layer, a titanium oxide layer, or an aluminum oxide layer. Alternatively, the second touch insulating layer TINS2 may be formed of an organic layer such as acryl resin, epoxy resin, phenolic resin, polyamide resin, polyim-ide resin or the like.

The dummy electrodes DE, the driving electrodes TE and the sensing electrodes RE may be disposed on the second touch insulating layer TINS2. Further, the first touch driving lines TL1, the second touch driving lines TL2, and the touch sensing lines RL shown in FIG. 6, as well as the dummy electrodes DE, driving electrodes TE, and the touch sensing electrodes RE, may be arranged on the second touch insu-lating layer TINS2.

The driving electrodes TE, the sensing electrodes RE, and the dummy electrodes DE may be formed of a conductive metal electrode, and the conductive metal electrode may be formed of molybdenum (Mo), aluminum (Al), chromium (Cr), gold (Au), titanium (Ti), nickel (Ni), neodymium (Nd), or copper (Cu), or an alloy thereof. The driving electrodes TE, the sensing electrodes RE, and the dummy electrodes DE may be formed in a mesh structure or a net structure. The driving electrodes TE, the sensing electrodes RE, and the dummy electrodes DE may have a structure that does not overlap the emission areas EA1 to EA4. Each driving electrode TE and each sensing electrode RE may partially overlap the connection electrode CE in the third direction (Z-axis direction). The driving electrode TE may be con-nected to the connection electrode CE through a touch contact hole penetrating the second touch insulating layer TINS2.

The third touch insulating layer TINS3 may be formed on the second touch insulating layer TINS2, which may include the dummy electrodes DE, the driving electrodes TE, and the sensing electrodes RE. The third touch insulating layer TINS3 may planarize a step difference formed by the driving electrodes TE, the sensing electrodes RE, and the connection electrode CE. To this end, the third touch insulating layer TINS3 may be formed of an inorganic layer, that is, a silicon nitride layer, a silicon oxynitride layer, a silicon oxide layer, a titanium oxide layer, or an aluminum oxide layer. Alter-natively, the third touch insulating layer TINS3 may be formed of an organic layer such as acryl resin, epoxy resin, phenolic resin, polyamide resin, polyimide resin or the like.

A plurality of color filter layers CFL may be formed on the touch sensing unit TSU. For example, the plurality of color filter layers CFL may include color filters of a red color, a blue color, and a green color, and may be disposed on the third touch insulating layer TINS3 to be located on the same plane.

The code placement unit PIU including a plurality of code patterns CP patterned in a planar code shape and a pattern protection layer BRC covering and shielding the plurality of code patterns CP may be formed on the touch sensing unit TSU on which the color filter layers CFL are formed.

The code placement unit PIU may include the transparent insulating layer UP, the plurality of code patterns CP, and the pattern protection layer BRC. The transparent insulating layer UP may be formed on the front surface of the touch sensing unit TSU. The plurality of code patterns CP may be patterned and formed in preset planar code shapes on the transparent insulating layer UP. The pattern protection layer BRC may cover and shield the plurality of code pattern CP.

The transparent insulating layer UP may be formed on the touch sensing unit TSU on which the color filter layers CFL are formed, and the transparent insulating layer UP may be formed of an inorganic layer. For example, the transparent insulating layer UP may be formed of a silicon nitride layer, a silicon oxynitride layer, a silicon oxide layer, a titanium oxide layer, or an aluminum oxide layer.

A light blocking member may be applied to the front surface of the transparent insulating layer UP. The light blocking member applied to the front surface of the trans-parent insulating layer UP may be patterned into preset planar code shapes to form the position code patterns CP. In detail, the light blocking member applied on the transparent insulating layer UP may be subjected to exposure and patterning processes using a mask, and may be formed as the code patterns CP in preset code pattern forming regions. In this case, a formation width of the code patterns CP may be equal to or greater than a formation width of the driving electrodes TE, sensing electrodes RE, and dummy elec-trodes DE formed in the touch sensing unit TSU in a rear direction.

The light blocking member patterned with the code pat-terns CP may be formed of materials including an infrared absorbing material or an ultraviolet absorbing material. For example, the light blocking member may be formed of a material containing inorganic or organic pigments. Here, the inorganic pigment may be a pigment containing at least one of carbon black, cyanine, polymethine, anthraquinone, or phthalocyanine-based compounds. On the other hand, the organic pigment may include at least one of lactam black, perylene black, or aniline black. The inorganic pigments and the organic pigments are not limited thereto, and other materials may be used.

The pattern protection layer BRC and the plurality of code patterns CP may be formed on the front surface of the transparent insulating layer UP including the plurality of code patterns CP. The pattern protection layer BRC may be a shielding layer. The pattern protection layer BRC may reduce or prevent a defect in which the plurality of code patterns CP may be deteriorated. More particularly, the pattern protection layer BRC may reduce or prevent a change in a chemical component of the code patterns, which may include a change in a chemical component over time. The pattern protection layer BRC may be formed of a single inorganic layer of at least one of a silicon nitride layer, a silicon oxy nitride layer, a silicon oxide layer, a titanium oxide layer, and an aluminum oxide layer. The pattern protection layer BRC may be formed of a plurality of inorganic layers that may be alternately stacked. For example, the pattern protection layer BRC may be formed of multiple layers in which one or more inorganic layers of a silicon nitride layer, a silicon oxynitride layer, a silicon oxide layer, a titanium oxide layer or an aluminum oxide layer may be alternately stacked. Such a pattern protection layer BRC may planarize a step difference formed by the plurality of code patterns CP.

An adhesive layer PSA coated with an adhesive material may be formed on the code placement unit PIU in which a plurality of code patterns CP are shielded by the pattern protection layer BRC. The pattern protection layer BRC may separate the plurality of code patterns CP from the adhesive layer PSA coated with an adhesive material. A front protective cover UTG may be attached by the adhesive layer PSA to the front surface of the display unit DU including the pattern protection layer BRC. In this way, the adhesive layer PSA may be formed on the pattern protection layer BRC that covers and shields the plurality of code patterns CP, and a deterioration of the plurality of code patterns CP that may be caused by the adhesive material may be slowed or prevented.

Figure 12:
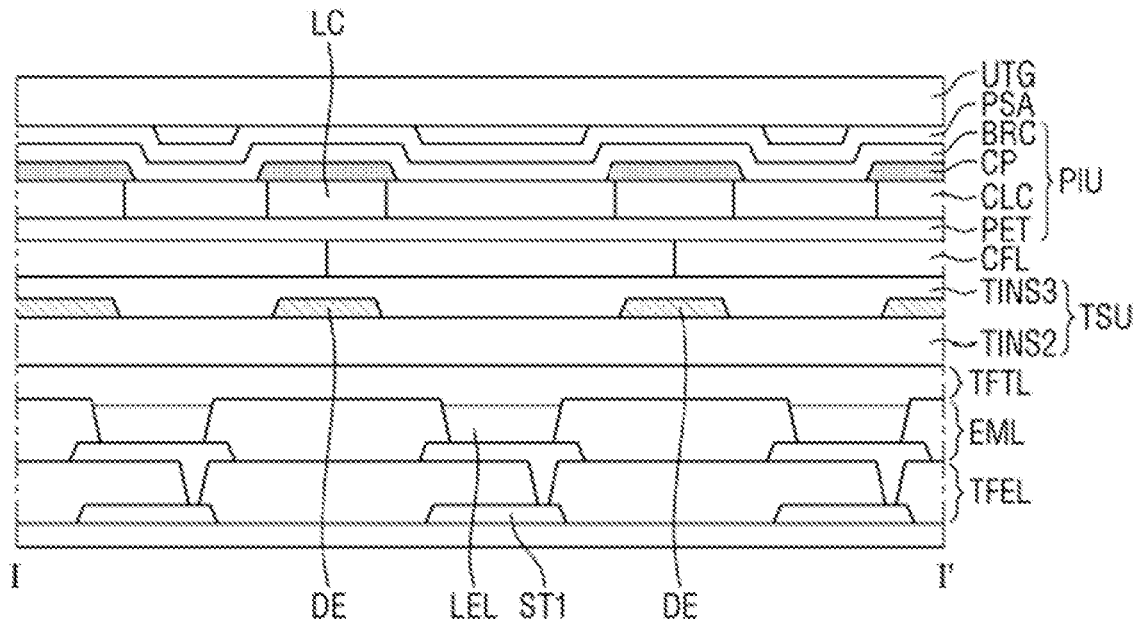
FIG. 12 is a cross-sectional view schematically showing the cross-section of I-I' of FIG. 9 according to a second embodiment.

FIG. 12 is a cross-sectional view schematically showing the cross-section of I-I' of FIG. 9 according to a second embodiment.

Referring to FIG. 12, the code placement unit PIU may include the plurality of code patterns CP and the pattern protection layer BRC. The pattern protection layer BRC may shield and block the plurality of code patterns CP by covering the plurality of code patterns CP. The code placement unit PIU may be formed on the touch sensing unit TSU. The color filter layer CFL may be formed between the touch sensing unit TSU and the code placement unit PIU.

The code placement unit PIU may include a transparent layer PET formed on the front surface of the touch sensing unit TSU, and a reflection pattern layer CLC disposed on the front surface of the transparent layer PET. A plurality of reflective patterns LC may be formed in the reflection pattern layer CLC in a region corresponding to a code pattern formation region. In addition, the code placement unit PIU may include the plurality of code patterns CP patterned and formed in preset planar code shapes in a region corresponding to the code pattern formation region, and the pattern protection layer BRC shielding and blocking the plurality of code patterns CP by covering the plurality of code patterns CP.

Specifically, the transparent layer PET may be formed on the touch sensing unit TSU, on which the color filter layers CFL may be formed. Further, the transparent layer PET may be a flexible film made of a transparent material.

The reflection pattern layer CLC may have a plurality of reflective patterns LC formed in an area corresponding to a preset code pattern formation area. The reflection pattern layer CLC may be disposed on the front surface of the transparent layer PET. That is, the plurality of reflective patterns LC of the reflection pattern layer CLC may be disposed below the plurality of code patterns CP. The plurality of reflective patterns LC may be formed in an area where the touch electrodes SEN and the dummy electrodes DE of the touch sensing unit TSU are disposed and a predetermined code pattern forming region. The plurality of reflective patterns LC may be made of an anisotropic light refraction material such as liquid crystal, or a material such as molybdenum (Mo), aluminum (Al), chromium (Cr), gold (Au), titanium (Ti), nickel (Ni), neodymium (Nd), or copper (Cu), or an alloy thereof. Remaining regions in which the plurality of reflective patterns LC are not formed may be formed of an inorganic layer, for example, a silicon nitride layer, a silicon oxynitride layer, a silicon oxide layer, a titanium oxide layer, or an aluminum oxide layer.

The light blocking member may be applied to the front surface of the reflection pattern layer CLC. The applied light blocking member may be patterned into preset planar code shapes to form the position code patterns CP. In this case, a formation width of the code patterns CP may be smaller than the widths of the reflective patterns LC formed in reflection pattern layer CLC in the rear direction.

The pattern protection layer BRC covering and shielding the plurality of code patterns CP may be formed on the front surface of the reflection pattern layer CLC including the plurality of code patterns CP. The pattern protection layer BRC may be formed of an organic layer such as acryl resin, epoxy resin, phenolic resin, polyamide resin, polyimide resin or the like.

The adhesive layer PSA coated with an adhesive material may be formed on the reflection pattern layer CLC in which a plurality of code patterns CP are shielded by the pattern protection layer BRC. The pattern protection layer BRC may separate the plurality of code patterns CP from the adhesive layer PSA coated with an adhesive material. The front protective cover UTG may be attached by the adhesive layer PSA to the front surface of the display unit DU including the pattern protection layer BRC. Since the adhesive layer PSA may be formed on the pattern protection layer BRC that covers and shields the plurality of code patterns CP, it may be possible to slow or prevent a deterioration of the plurality of code patterns CP that may be caused by the adhesive material.

Figure 13:
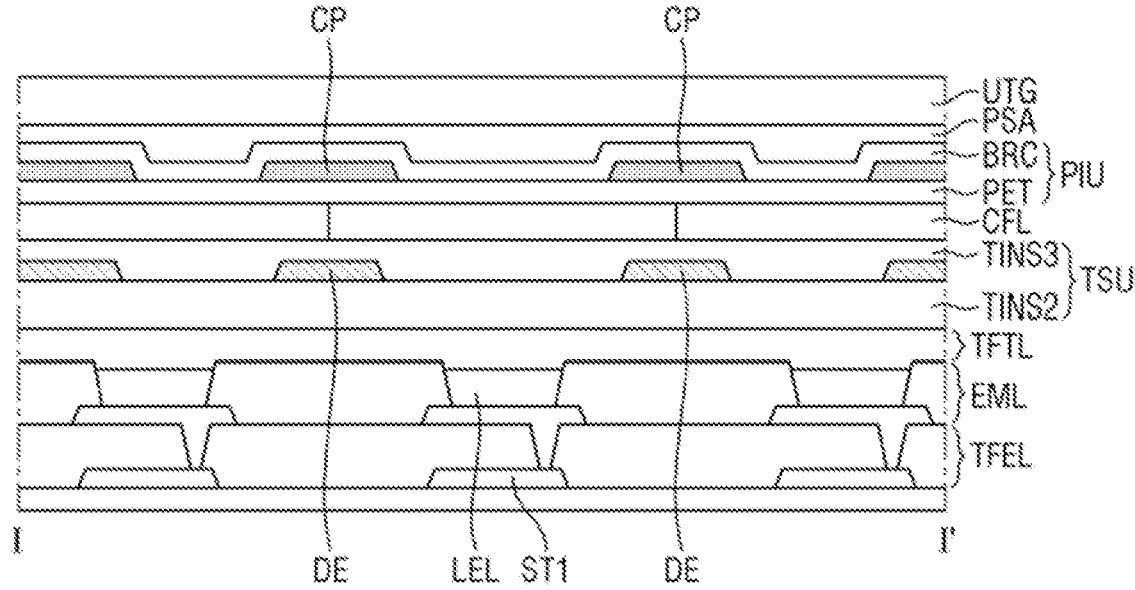
FIG. 13 is a cross-sectional view schematically showing the cross-section of I-I' of FIG. 9 according to a third embodiment.

FIG. 13 is a cross-sectional view schematically showing the cross-section of I-I' of FIG. 9 according to a third embodiment.

Referring to FIG. 13, the code placement unit PIU, which may include the plurality of code patterns CP and the pattern protection layer BRC, may shield and block a plurality of code patterns CP by covering the plurality of code patterns CP. The code placement unit PIU may be formed on the touch sensing unit TSU in which the color filter layer CFL is formed.

The code placement unit PIU may include a transparent layer PET, a plurality of code patterns CP, and a pattern protection layer BRC. The transparent layer PET may be formed on the front surface of the touch sensing unit TSU. The plurality of code patterns CP may be patterned and formed in preset planar code shapes on the transparent layer PET. The pattern protection layer BRC may cover and shield the plurality of code patterns CP.

Specifically, the transparent layer PET may be formed on the touch sensing unit TSU on which the color filter layer CFL is formed. Further, the transparent layer PET may be a flexible film made of a transparent material.

A light blocking member may be applied to the front surface of the transparent layer PET, and the applied light blocking member may be patterned into preset planar code shapes to form the position code patterns CP. Specifically, the light blocking member applied on the transparent layer PET may be subjected to exposure and patterning processes using a mask, and may be formed as the code patterns CP in preset code pattern forming regions. In this case, a formation width of the code patterns CP may be equal to or greater than a formation width of the driving electrodes TE, sensing electrodes RE, and dummy electrodes DE formed in the touch sensing unit TSU in the rear direction.

The pattern protection layer BRC may be formed on the front surface of the transparent layer PET including the plurality of code patterns CP. The pattern protection layer BRC may cover and shield the plurality of code patterns CP. The pattern protection layer BRC may be formed of multiple layers in which one or more inorganic layers of a silicon nitride layer, a silicon oxynitride layer, a silicon oxide layer, a titanium oxide layer or an aluminum oxide layer may be alternately stacked. Such a pattern protection layer BRC may serve to planarize a step difference formed by the plurality of code patterns CP.

The adhesive layer PSA coated with an adhesive material may be formed on the code placement unit PIU in which a plurality of code patterns CP are shielded by the pattern protection layer BRC. The pattern protection layer BRC may separate the plurality of code patterns CP from the adhesive layer PSA coated with an adhesive material. The front protective cover UTG may be attached by the adhesive layer PSA to the front surface of the display unit DU including the pattern protection layer BRC.

Figure 14:
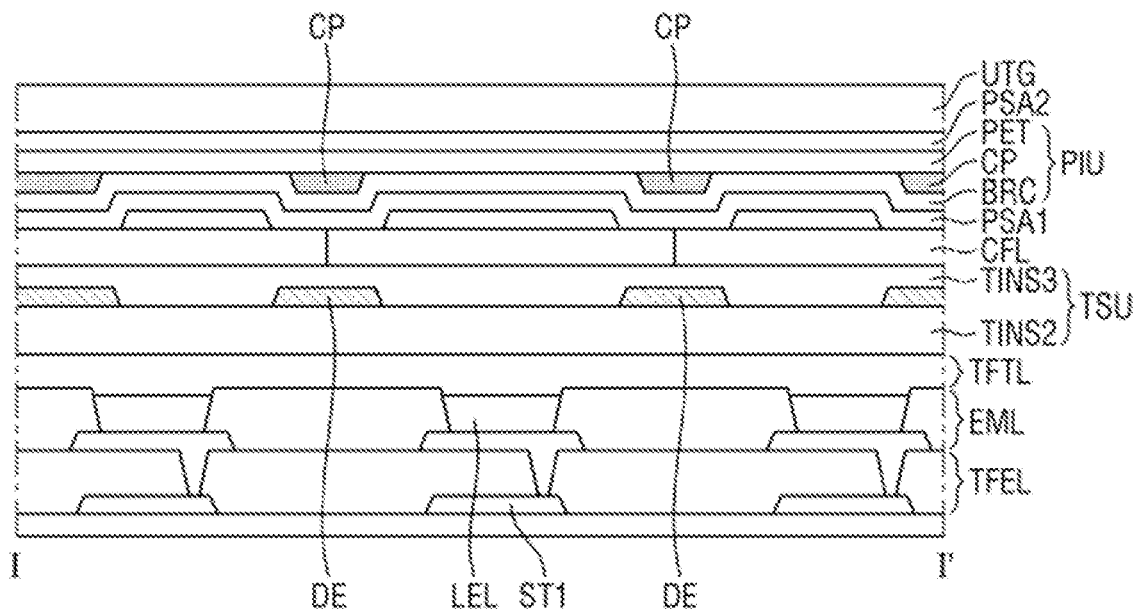
FIG. 14 is a cross-sectional view schematically showing the cross-section of I-I' of FIG. 9 according to a fourth embodiment.

FIG. 14 is a cross-sectional view schematically showing the cross-section of I-I' of FIG. 9 according to a fourth embodiment.

Referring to FIG. 14, the code placement unit PIU may include the plurality of code patterns CP and the pattern protection layer BRC. The code placement unit PIU may be attached to the touch sensing unit TSU by a first adhesive layer PSAL. Specifically, the code placement unit PIU may be manufactured separately from the display panel 100 including the touch sensing unit TSU, and may be attached and placed on the front of the touch sensing unit TSU to face the touch sensing unit TSU.

The code placement unit PIU may include a transparent layer PET. The plurality of code patterns CP and the pattern protection layer BRC may be formed on the transparent layer PET.

Specifically, separate from the display panel 100, a light blocking member may be applied to a surface of the transparent layer PET, and the applied light blocking member may be patterned into preset planar code shapes to form position code patterns CP.

The pattern protection layer BRC may be formed on the surface of the transparent layer PET including the plurality of code patterns CP. The pattern protection layer BRC may cover and shield the plurality of code patterns CP. The pattern protection layer BRC may be formed of multiple layers in which one or more inorganic layers of a silicon nitride layer, a silicon oxynitride layer, a silicon oxide layer, a titanium oxide layer or an aluminum oxide layer may be alternately stacked. Alternatively, the pattern protection layer BRC may be formed of an organic layer such as acrylic resin, epoxy resin, phenolic resin, polyamide resin, or polyimide resin. When the pattern protection layer BRC is formed of an inorganic layer, the pattern protection layer BRC may serve to planarize a step difference formed by the plurality of code patterns CP.

The first adhesive layer PSA1 coated with an adhesive material may be formed on the code placement unit PIU in which a plurality of code patterns CP are shielded by the pattern protection layer BRC. The pattern protection layer BRC may separate the plurality of code patterns CP from the first adhesive layer PSAL. The code placement unit PIU on which the first adhesive layer PSA1 is formed may be attached to the front surface of the touch sensing unit TSU and the color filter layers CFL so that the code placement unit PIU may face the touch sensing unit TSU.

Thereafter, a second adhesive layer PSA2 may be formed of an adhesive material on the transparent layer PET disposed in the front direction, and the front protective cover UTG may be attached on the front surface of the display unit DU including the transparent layer PET by the second adhesive layer PSA2.

The adhesive layer PSA coated with an adhesive material may be formed on the code placement unit PIU. The front protective cover UTG may be attached by the adhesive layer PSA to the front surface of the display unit DU including the pattern protection layer BRC.

Figure 15:
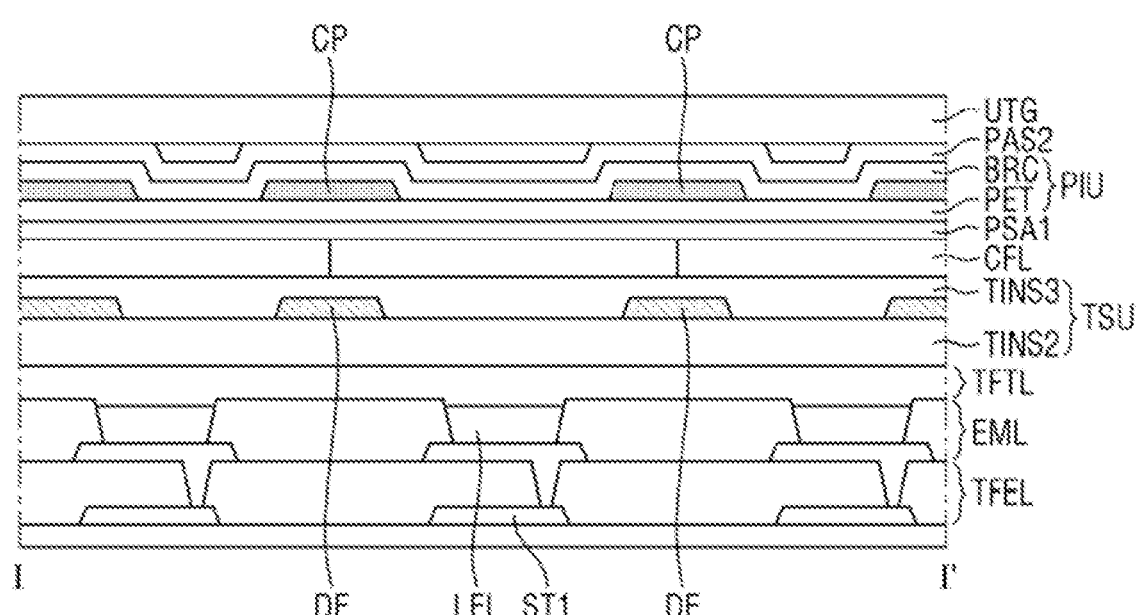
FIG. 15 is a cross-sectional view schematically showing the cross-section of I-I' of FIG. 9 according to a fifth embodiment.

FIG. 15 is a cross-sectional view schematically showing the cross-section of I-I' of FIG. 9 according to a fifth embodiment.

Referring to FIG. 15, the code placement unit PIU may include the plurality of code patterns CP and the pattern protection layer BRC. The code placement unit PIU may be manufactured separately from the display panel 100 including the touch sensing unit TSU. The code placement unit PIU may be mounted and attached to the front direction of the touch sensing unit TSU.

As described above, the code placement unit PIU may include the transparent layer PET, the plurality of code patterns CP patterned and formed in preset planar code shapes on the transparent layer PET, and the pattern protection layer BRC covering and shielding the plurality of code patterns CP.

Separate from the display panel 100, a light blocking member may be applied to a front surface of the transparent layer PET, and the applied light blocking member may be patterned into preset planar code shapes to form position code patterns CP.

The pattern protection layer BRC may be formed on the front surface of the transparent layer PET including the plurality of code patterns CP. The pattern protection layer BRC may cover and shield the plurality of code patterns CP. The pattern protection layer BRC may be formed of multiple layers in which one or more inorganic layers of a silicon nitride layer, a silicon oxynitride layer, a silicon oxide layer, a titanium oxide layer or an aluminum oxide layer may be alternately stacked. Alternatively, the pattern protection layer BRC may be formed of an organic layer such as acrylic resin, epoxy resin, phenolic resin, polyamide resin, or polyimide resin. When the pattern protection layer BRC is formed of an inorganic layer, the pattern protection layer BRC may serve to planarize a step difference formed by the plurality of code patterns CP.

The first adhesive layer PSA1 coated with an adhesive material may be formed on the touch sensing unit TSU or the color filter layers CFL of the display panel 100. The transparent layer PET of the code placement unit PIU in which the first adhesive layer PSA1 is formed may be mounted and attached in the front direction of the touch sensing unit TSU and the color filter layer CFL.

The second adhesive layer PSA2 may be formed of an adhesive material on the pattern protection layer BRC of the code placement unit PIU. The front protective cover UTG may be attached to the front surface of the display unit DU including the pattern protection layer BRC by the second adhesive layer PSA2. The pattern protection layer BRC may separate the plurality of code patterns CP from the second adhesive layer PSA2. In this way, since the second adhesive layer PSA2 may be formed on the pattern protection layer BRC that covers and shields the plurality of code patterns CP, it may be possible to reduce or prevent the plurality of code patterns CP from being deteriorated by the adhesive material.

In concluding the detailed description, those skilled in the art will appreciate that many variations and modifications can be made to preferred embodiments without substantially departing from the principles of the present disclosure. Therefore, preferred embodiments of the disclosure are used in a generic and descriptive sense only and not for purposes of limitation.

What is claimed is:

1. A display device comprising:
a display unit;
a touch sensing unit disposed on a front surface of the display unit;
a code placement unit including a transparent layer, a plurality of code patterns and a pattern protection layer directly contacting an entirety of lateral side surfaces of the plurality of code patterns and a front surface of the transparent layer, the code placement unit is disposed on a front surface of the touch sensing unit; and
an adhesive material disposed directly on a front surface of the code placement unit and directly contacting a front surface of the pattern protection layer that is a farthest surface of the code placement unit from the front surface of the touch sensing unit,
wherein the plurality of code patterns having a plurality of preset planar code shapes having different shapes are disposed on the transparent layer, and
wherein the pattern protection layer is disposed on the transparent layer, covers the plurality of code patterns and separates the plurality of code patterns from the adhesive material.

2. The display device of claim 1, wherein the transparent layer is a transparent insulating layer forming a rear surface of the code placement unit facing the touch sensing unit,
wherein the plurality of code patterns are disposed on a front surface of the transparent insulating layer facing away from the touch sensing unit, and
wherein the pattern protection layer covers the plurality of code patterns and at least a portion of the front surface of the transparent insulating layer.

3. The display device of claim 1,
wherein the plurality of code patterns are disposed on a front surface of a transparent layer of the code placement unit, and
wherein an adhesive layer is disposed on a rear surface of the transparent layer and attaches the code placement unit to the touch sensing unit.

4. A display device comprising:
a display unit including a plurality of emission areas;
a touch sensing unit disposed on a front surface of the display unit;
a code placement unit including a plurality of code patterns and a pattern protection layer covering and shielding the plurality of code patterns, the pattern protection layer directly contacting an entirety of lateral side surfaces of the plurality of code patterns, the code placement unit is disposed on a front surface of the touch sensing unit;
an adhesive material disposed directly on a front surface of the pattern protection layer of the code placement unit that is a farthest surface of the code placement unit from the front surface of the touch sensing unit; and a front protective cover attached to the code placement unit by the adhesive material.

5. The display device of claim 4, wherein the pattern protection layer covers the plurality of code patterns, forms a front surface of the code placement unit disposed away from the touch sensing unit, separates the plurality of code patterns from the adhesive material, and prevents a change in a chemical component of the plurality of code patterns due to the adhesive material,
wherein the adhesive material is disposed on the front surface of the code placement unit.

6. The display device of claim 4, wherein the code placement unit further comprises a transparent insulating layer forming a rear surface of the code placement unit facing the touch sensing unit,
wherein the plurality of code patterns have a plurality of preset planar code shapes on a surface of the transparent insulating layer, and
wherein the pattern protection layer covers the plurality of code patterns and at least a portion of the surface of the transparent insulating layer, and separates the plurality of code patterns from the adhesive material.

7. The display device of claim 4,
wherein the pattern protection layer comprises at least one inorganic layer including at least one of a silicon nitride layer, a silicon oxynitride layer, a silicon oxide layer, a titanium oxide layer, or an aluminum oxide layer.

8. The display device of claim 4,
wherein the pattern protection layer comprises at least one organic layer including at least one of an acrylic resin, an epoxy resin, a phenolic resin, a polyamide resin, or a polyimide resin.

9. The display device of claim 4,
wherein the touch sensing unit comprises a plurality of dummy electrodes,
the plurality of code patterns correspond to and overlap the plurality of dummy electrodes, and
each code pattern of the plurality of code patterns has a first width, and the first width is equal to or greater than widths of driving electrodes, sensing electrodes, and the plurality of dummy electrodes formed in the touch sensing unit.

10. The display device of claim 9,
wherein a planar code shape of the plurality of code patterns has a pattern shape surrounding and exposing a light emitting element disposed below the planar code shape and comprising at least one of a polygonal pattern shape, a polygonal closed loop pattern shape, a mesh pattern structure, or an open loop pattern shape.

11. The display device of claim 4, wherein the code placement unit comprises:
a transparent layer forming a rear surface of the code placement unit facing the touch sensing unit; and
a reflection pattern layer including a plurality of reflective patterns formed below the plurality of code patterns, corresponding to a code pattern formation region, and disposed between the code placement unit and the transparent layer.

12. The display device of claim 11,
wherein the plurality of code patterns have a plurality of planar code shapes disposed on a reflection pattern of the reflection pattern layer,
wherein the pattern protection layer covers the plurality of code patterns and the reflection pattern layer, and
wherein the adhesive material is applied onto the pattern protection layer.

13. The display device of claim 11, wherein the plurality of reflective patterns are formed in a region in which touch electrodes and dummy electrodes of the touch sensing unit are disposed and in the code pattern formation region, and wherein a remaining region in which the plurality of reflective patterns are not formed is formed of a silicon nitride layer, a silicon oxynitride layer, a silicon oxide layer, a titanium oxide layer, or an aluminum oxide layer.

14. The display device of claim 4, wherein the plurality of code patterns have a plurality of planar code shapes on a transparent layer of the code placement unit, and wherein the pattern protection layer is formed to cover the plurality of code patterns and at least a portion of a surface of the transparent layer.

15. The display device of claim 4, wherein the plurality of code patterns have a plurality of planar code shapes on a transparent layer of the code placement unit, wherein the pattern protection layer is formed to cover the plurality of code patterns and at least a portion of a surface of the transparent layer, and wherein the pattern protection layer of the code placement unit is attached to face the touch sensing unit by a first adhesive layer.

16. The display device of claim 4, wherein the plurality of code patterns have a plurality of planar code shapes on a transparent layer of the code placement unit, wherein the transparent layer forms a rear surface of the code placement unit facing the touch sensing unit, wherein a second adhesive layer is disposed on the transparent layer and attaches the code placement unit to the touch sensing unit.

17. A position input system comprising:

a display device displaying an image; and a position input device in which coordinate data is input, wherein the display device comprises:

a display unit including a plurality of emission areas;

a touch sensing unit disposed on a front surface of the display unit to sense touch coordinates;

a code placement unit including a rear surface disposed on the touch sensing unit, a plurality of code patterns disposed on the touch sensing unit, and a pattern protection layer forming a front surface of the code placement unit that is a farthest surface of the code placement unit from a front surface of the touch sensing unit, the pattern protection layer covering and shielding the plurality of code patterns, the pattern protection layer directly contacting an entirety of lateral side surfaces of the plurality of code patterns;

an adhesive material disposed directly on the front surface of the code placement unit formed by the pattern protection layer; and a front protective cover attached onto the front surface of code placement unit by the adhesive material.

18. The position input system of claim 17, wherein the plurality of code patterns have a plurality of planar code shapes on a transparent layer of the code placement unit, wherein the pattern protection layer is formed to cover the plurality of code patterns and at least a portion of a surface of the transparent layer, wherein the pattern protection layer of the code placement unit is attached to face the touch sensing unit by a first adhesive layer, and wherein the position input device is configured to generate coordinate data corresponding to the plurality of planar code shapes of the code pattern.

19. An electronic device including a display device, the display device comprising:

a display unit;

a touch sensing unit disposed on a front surface of the display unit;

a code placement unit including a transparent layer, a plurality of code patterns and a pattern protection layer directly contacting an entirety of lateral side surfaces of the plurality of code patterns and a front surface of the transparent layer, the code placement unit is, disposed on a front surface of the touch sensing unit; and an adhesive material disposed directly on a front surface of the code placement unit and directly contacting a front surface of the pattern protection layer that is a farthest surface of the code placement unit from the front surface of the touch sensing unit, wherein the plurality of code patterns having a plurality of preset planar code shapes having different shapes are disposed on the transparent layer, and wherein the pattern protection layer is disposed on the transparent layer, covers the plurality of code patterns and separates the plurality of code patterns from the adhesive material.

\* \* \* \* \*